(12) United States Patent
Naghshvar et al.

(10) Patent No.: US 10,064,186 B2
(45) Date of Patent: Aug. 28, 2018

(54) LOAD-BASED TECHNIQUES FOR SELECTING A WIRELESS OPERATING CHANNEL IN AN UNLICENSED SPECTRUM

(71) Applicant: QUALCOMM Incorporated, San Diego, CA (US)

(72) Inventors: Mohammad Naghshvar, San Diego, CA (US); Ahmed Sadek, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/452,322

(22) Filed: Mar. 7, 2017

(65) Prior Publication Data

US 2017/0265195 A1    Sep. 14, 2017

Related U.S. Application Data

(60) Provisional application No. 62/305,365, filed on Mar. 8, 2016.

(51) Int. Cl.
*H04W 72/00* (2009.01)
*H04W 72/04* (2009.01)
*H04B 17/318* (2015.01)

(52) U.S. Cl.
CPC ...... *H04W 72/0453* (2013.01); *H04B 17/318* (2015.01); *H04W 72/0486* (2013.01)

(58) Field of Classification Search
CPC . H04W 72/082; H04W 24/10; H04W 72/085; H04W 24/02; H04W 72/046; H04W 84/18; H04W 36/06; H04W 4/00; H04W 28/0231; H04W 28/0252; H04W 28/048; H04W 28/16; H04W 72/04; H04W 72/0453; H04W 72/1231; H04W 72/0446; H04W 72/00; H04W 84/12; H04W 88/10; H04W 16/14; H04W 74/0808;
(Continued)

(56) References Cited

U.S. PATENT DOCUMENTS 6,052,596 A    4/2000   Barnickel
2004/0253953 A1   12/2004   Pedraza et al.
(Continued)

FOREIGN PATENT DOCUMENTS

EP    3122099 A1    1/2017
WO    WO-2016186742    11/2016

OTHER PUBLICATIONS

ISA/EPO, Partial International Search Report of the International Searching Authority, Int'l. App. No. PCT/US2017/021307, dated Jun. 2, 2017, European Patent Office, Rijswijk, NL, 17 pgs.
(Continued)

*Primary Examiner* — Nimesh Patel
(74) *Attorney, Agent, or Firm* — Holland & Hart LLP

(57) ABSTRACT

Techniques are described for wireless communication at a wireless communication device. One method includes obtaining a plurality of signal strength samples for a first wireless channel during a measurement period; determining a loading parameter of the first wireless channel based at least in part on a distribution of the signal strength samples for the first wireless channel among a set of predefined signal strength bins; and selecting a wireless operating channel based at least in part on the determined loading parameter of the first wireless channel.

31 Claims, 14 Drawing Sheets

(58) Field of Classification Search
CPC . H04W 88/06; H04W 28/08; H04W 74/0816; H04W 28/0289; H04W 72/042; H04W 74/006; H04W 74/04; H04L 1/205; H04L 43/08; H04L 7/033; H04L 1/0071; H04L 47/826; H04L 5/0007; H04L 1/20; H04L 2025/0377

See application file for complete search history.

(56) References Cited

U.S. PATENT DOCUMENTS

| | | |
|---|---|---|
| 2005/0003828 A1 | 1/2005 | Sugar et al. |
| 2007/0161373 A1 | 7/2007 | Klatt |
| 2009/0067448 A1 | 3/2009 | Stanwood et al. |
| 2012/0190389 A1 | 7/2012 | Hui |
| 2013/0121177 A1 | 5/2013 | Morton et al. |
| 2013/0208587 A1 | 8/2013 | Bala et al. |
| 2014/0169432 A1 | 6/2014 | Ponnuswamy |
| 2015/0296384 A1 | 10/2015 | Sadek et al. |
| 2015/0381291 A1 | 12/2015 | Mahajan et al. |

OTHER PUBLICATIONS

ISA/EP, International Search Report and Written Opinion of the International Searching Authority, Int'l Application No. PCT/US2017/021307, dated Jul. 28, 2017, European Patent Office, Rijswijk, NL, 24 pgs.

| Bin number (j) | RSSI Range | Default Penalty Value ($q_j$) |
|---|---|---|
| 1 | RSSI>-62dBm | 60 |
| 2 | -72dBm<RSSI<=-62dBm | 30 |
| 3 | -82dBm<RSSI<=-72dBm | 15 |
| 4 | -92dBm<RSSI<=-82dBm | 2 |
| 5 | -102dBm<RSSI<=-92dBm | 0 |
| 6 | -112dBm<RSSI<=-102dBm | 0 |
|  | RSSI<=-112dBm |  |

FIG. 6

LOAD-BASED TECHNIQUES FOR SELECTING A WIRELESS OPERATING CHANNEL IN AN UNLICENSED SPECTRUM

CROSS REFERENCES

The present application for patent claims priority to U.S. Provisional Patent Application No. 62/305,365 by Naghshvar, et al., entitled "Load-Based Techniques For Selecting A Wireless Operating Channel in an Unlicensed Spectrum," filed Mar. 8, 2016, assigned to the assignee hereof.

BACKGROUND

Field of the Disclosure

The present disclosure, for example, relates to wireless communication systems, and more particularly to load-based techniques for selecting a wireless operating channel in an unlicensed spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations or small cells, each simultaneously supporting communication for multiple communication devices, otherwise known as user equipment (UEs). A base station or small cell may communicate with UEs on downlink channels (e.g., for transmissions from a base station or small cell to a UE) and uplink channels (e.g., for transmissions from a UE to a base station or small cell).

Some modes of communication may enable communication between a base station or small cell and a UE over an unlicensed spectrum, or over different spectrums (e.g., a licensed spectrum and an unlicensed spectrum). With increasing data traffic in cellular networks that use a dedicated (e.g., licensed) spectrum, offloading of at least some data traffic to an unlicensed spectrum may provide a mobile network operator (or cellular operator) with opportunities for enhanced data transmission capacity. Unlicensed spectrum may also provide service in areas where access to a licensed spectrum is unavailable.

In some scenarios, a wireless communication device (e.g., a base station, small cell, or UE) may select a wireless operating channel, for use in an unlicensed spectrum, from a plurality of wireless channels available for use in the unlicensed spectrum. The wireless operating channel may be selected based on energy detection. For example, the wireless communication device may detect an energy level on each wireless channel of the plurality of wireless channels, and may select a wireless channel associated with a lowest energy level as a wireless operating channel for the wireless communication device.

SUMMARY

Load-based techniques for selecting a wireless operating channel in an unlicensed spectrum are described. When selecting a wireless operating channel based on energy detection, a first wireless channel may be selected as a wireless operating channel for a wireless communication device because a peak energy level detected on the first wireless channel is lower than a peak energy level detected on a second wireless channel. However, the load on the second wireless channel (or utilization of the second wireless channel) may be lower than the load on the first wireless channel, and because of the difference in channel loads, the second wireless channel may be the better wireless operating channel for the wireless communication device. The load-based channel selection techniques described in the present disclosure may enable a wireless communication device to select an overall better wireless operating channel for the wireless communication device.

In one example, a method for wireless communication at a wireless communication device is described. The method may include obtaining a plurality of signal strength samples for a first wireless channel during a measurement period; determining a loading parameter of the first wireless channel based at least in part on a distribution of the signal strength samples for the first wireless channel among a set of predefined signal strength bins; and selecting a wireless operating channel based at least in part on the determined loading parameter of the first wireless channel.

In some examples, the method may include scaling the determined loading parameter of the first wireless channel based at least in part on a duty cycle of communications by the wireless communication device over the first wireless channel. In some examples, the method may include determining a separate loading parameter of each of a plurality of wireless channels, in which the plurality of wireless channels include the first wireless channel. In these examples, selecting the wireless operating channel may include selecting the wireless operating channel from the plurality of wireless channels based at least in part on the determined separate loading parameters. In some examples, the method may include determining a sum penalty associated with each of the plurality of wireless channels, where the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter. In some examples, selecting the wireless operating channel may include determining that a first sum penalty associated with the first wireless channel is higher than a second sum penalty associated with a second wireless channel from the plurality of wireless channels, and switching a current wireless operating channel of the wireless communication device from the first wireless channel to the second wireless channel. In some examples, the second wireless channel may have a lowest sum penalty of the plurality of wireless channels. In some examples, the method may include determining a medium utilization of the first wireless channel by one or more neighboring wireless communication devices satisfies a threshold, and further switching the current wireless operating channel based at least in part on determining the medium utilization satisfies the threshold. In some examples, the method may include disabling a radio access technology-specific detection operation for at least a subset of the plurality of wireless channels.

In some examples of the method, the first wireless channel may include a channel of an unlicensed spectrum, and the wireless communication device may be associated with a mobile network operator using the unlicensed spectrum. In some examples, the method may include synchronizing the measurement period among multiple wireless communication devices associated with the mobile network operator. In some examples, the method may include detecting a presence of a different mobile network operator on the first wireless channel based at least in part on the determined loading parameter of the first wireless channel. In some examples, the method may include determining a medium utilization of the first wireless channel by one or more neighboring wireless communication devices, and inferring a radio access technology used by the different mobile network operator on the first wireless channel based at least in part on the determined medium utilization. In some examples, the method may include filtering a plurality of load estimates of the loading parameter using an infinite impulse response filter; where the wireless operating channel is selected based at least in part on the filtered load estimates.

In one example, an apparatus for wireless communication at a wireless communication device is described. The apparatus may include means for obtaining a plurality of signal strength samples for a first wireless channel during a measurement period; means for determining a loading parameter of the first wireless channel based at least in part on a distribution of the signal strength samples for the first wireless channel among a set of predefined signal strength bins; and means for selecting a wireless operating channel based at least in part on the determined loading parameter of the first wireless channel.

In some examples, the apparatus may include means for scaling the determined loading parameter of the first wireless channel based at least in part on a duty cycle of communications by the wireless communication device over the first wireless channel. In some examples, the apparatus may include means for determining a separate loading parameter of each of a plurality of wireless channels, in which the plurality of wireless channels includes the first wireless channel. In these examples, the means for selecting the wireless operating channel may include means for selecting the wireless operating channel from the plurality of wireless channels based at least in part on the determined separate loading parameters. In some examples, the apparatus may include means for determining a sum penalty associated with each of the plurality of wireless channels, where the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter. In some examples, the means for selecting the wireless operating channel may include means for determining that a first sum penalty associated with the first wireless channel is higher than a second sum penalty associated with a second wireless channel from the plurality of wireless channels, and means for switching a current wireless operating channel of the wireless communication device from the first wireless channel to the second wireless channel. In some examples, the second wireless channel may have a lowest sum penalty of the plurality of wireless channels. In some examples, the apparatus may include means for determining that a medium utilization of the first wireless channel by one or more neighboring wireless communication devices satisfies a threshold, and the means for switching may further switch the current wireless operating channel based at least in part on the means for determining the medium utilization satisfies the threshold.

In some examples, the apparatus may include means for disabling a radio access technology-specific detection operation for at least a subset of the plurality of wireless channels. In some examples, the first wireless channel may include a channel of an unlicensed spectrum, and the wireless communication device may be associated with a mobile network operator using the unlicensed spectrum. In some examples, the apparatus may include means for synchronizing the measurement period among multiple wireless communication devices associated with the mobile network operator. In some examples, the apparatus may include means for detecting a presence of a different mobile network operator on the first wireless channel based at least in part on the determined loading parameter of the first wireless channel. In some examples, the apparatus may include means for determining a medium utilization of the first wireless channel by one or more neighboring wireless communication devices, and means for inferring a radio access technology used by the different mobile network operator on the first wireless channel based at least in part on the determined medium utilization. In some examples, the apparatus may include means for filtering a plurality of load estimates of the loading parameter using an infinite impulse response filter; where the wireless operating channel is selected based at least in part on the filtered load estimates.

In one example, another apparatus for wireless communication at a wireless communication device is described. The apparatus may include a processor, and memory coupled to the processor. The processor may be configured to obtain a plurality of signal strength samples for a first wireless channel during a measurement period; to determine a loading parameter of the first wireless channel based at least in part on a distribution of the signal strength samples for the first wireless channel among a set of predefined signal strength bins; and to select a wireless operating channel based at least in part on the determined loading parameter of the first wireless channel.

In some examples of the apparatus, the processor may be configured to scale the determined loading parameter of the first wireless channel based at least in part on a duty cycle of communications by the wireless communication device over the first wireless channel. In some examples, the processor may be configured to determine a separate loading parameter of each of a plurality of wireless channels, in which the plurality of wireless channels includes the first wireless channel. In these examples, selecting the wireless operating channel may include selecting the wireless operating channel from the plurality of wireless channels based at least in part on the determined separate loading parameters. In some examples, the processor may be configured to determine a sum penalty associated with each of the plurality of wireless channels, where the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter. In some examples, selecting the wireless operating channel may include determining that a first sum penalty associated with the first wireless channel is higher than a second sum penalty associated with a second wireless channel from the plurality of wireless channels, and switching a current wireless operating channel of the wireless communication device from the first wireless channel to the second wireless channel. In some examples, the second wireless channel may have a lowest sum penalty of the plurality of wireless channels. In some examples, the processor may be configured to determine a medium utilization of the first wireless channel by one or more neighboring wireless communication devices satisfies a threshold, and further switch the current wireless operating channel based at least in part on determining the medium utilization satisfies the threshold. In some examples, the processor may be configured to disable a radio access technology-specific detection operation for at least a subset of the plurality of wireless channels.

In some examples of the apparatus, the first wireless channel may include a channel of an unlicensed spectrum, and the wireless communication device may be associated with a mobile network operator using the unlicensed spectrum. In some examples, the processor may be configured to synchronize the measurement period among multiple wireless communication devices associated with the mobile network operator. In some examples, the processor may be configured to detect a presence of a different mobile network operator on the first wireless channel based at least in part on the determined loading parameter of the first wireless channel. In some examples, the processor may be configured to determine a medium utilization of the first wireless channel by one or more neighboring wireless communication devices, and to infer a radio access technology used by the different mobile network operator on the first wireless channel based at least in part on the determined medium utilization. In some examples, the processor may be configured to filter a plurality of load estimates of the loading parameter using an infinite impulse response filter; where the wireless operating channel is selected based at least in part on the filtered load estimates.

In one example, a non-transitory computer-readable medium for storing instructions executable by a processor is described. The instructions may include instructions to obtain a plurality of signal strength samples for a first wireless channel during a measurement period; instructions to determine a loading parameter of the first wireless channel based at least in part on a distribution of the signal strength samples for the first wireless channel among a set of predefined signal strength bins; and instructions to select a wireless operating channel based at least in part on the determined loading parameter of the first wireless channel.

In some examples, the non-transitory computer-readable may further include instructions to determine a separate loading parameter of each of a plurality of wireless channels, in which the plurality of wireless channels comprising the first wireless channel. In these examples, selecting the wireless operating channel comprises selecting the wireless operating channel from the plurality of wireless channels based at least in part on the determined separate loading parameters. In some examples, the instructions may include instructions to determine a sum penalty associated with each of the plurality of wireless channels, where the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 shows an example penalty table that associates a set of signal strength bins with penalties, in accordance with various aspects of the present disclosure;

DETAILED DESCRIPTION

Techniques are described in which an unlicensed spectrum is used for at least a portion of communications in a wireless communication system. In some examples, the unlicensed spectrum may be used for Long Term Evolution (LTE) or LTE-Advanced (LTE-A) communications. The unlicensed spectrum may be used in combination with, or independent from, a licensed spectrum. The licensed spectrum may include a radio frequency spectrum licensed to particular users for particular uses. The unlicensed spectrum may include a radio frequency spectrum available for Wi-Fi use, a radio frequency spectrum available for use by different radio access technologies, or a radio frequency spectrum available for use by multiple mobile network operators (MNOs) in an equally shared or prioritized manner.

In some examples, a wireless communication device communicating over an unlicensed spectrum may obtain a plurality of signal strength samples (e.g., received signal strength indicator (RSSI) measurements) for a plurality of wireless channels during a measurement period. The wireless communication device may determine a separate loading parameter of each of the wireless channels. Each loading parameter may be based at least in part on a distribution of the signal strength samples obtained for a wireless channel among a set of predefined signal strength bins. The wireless communication device may select a wireless operating channel based at least in part on the determined loading parameters of the wireless channels.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
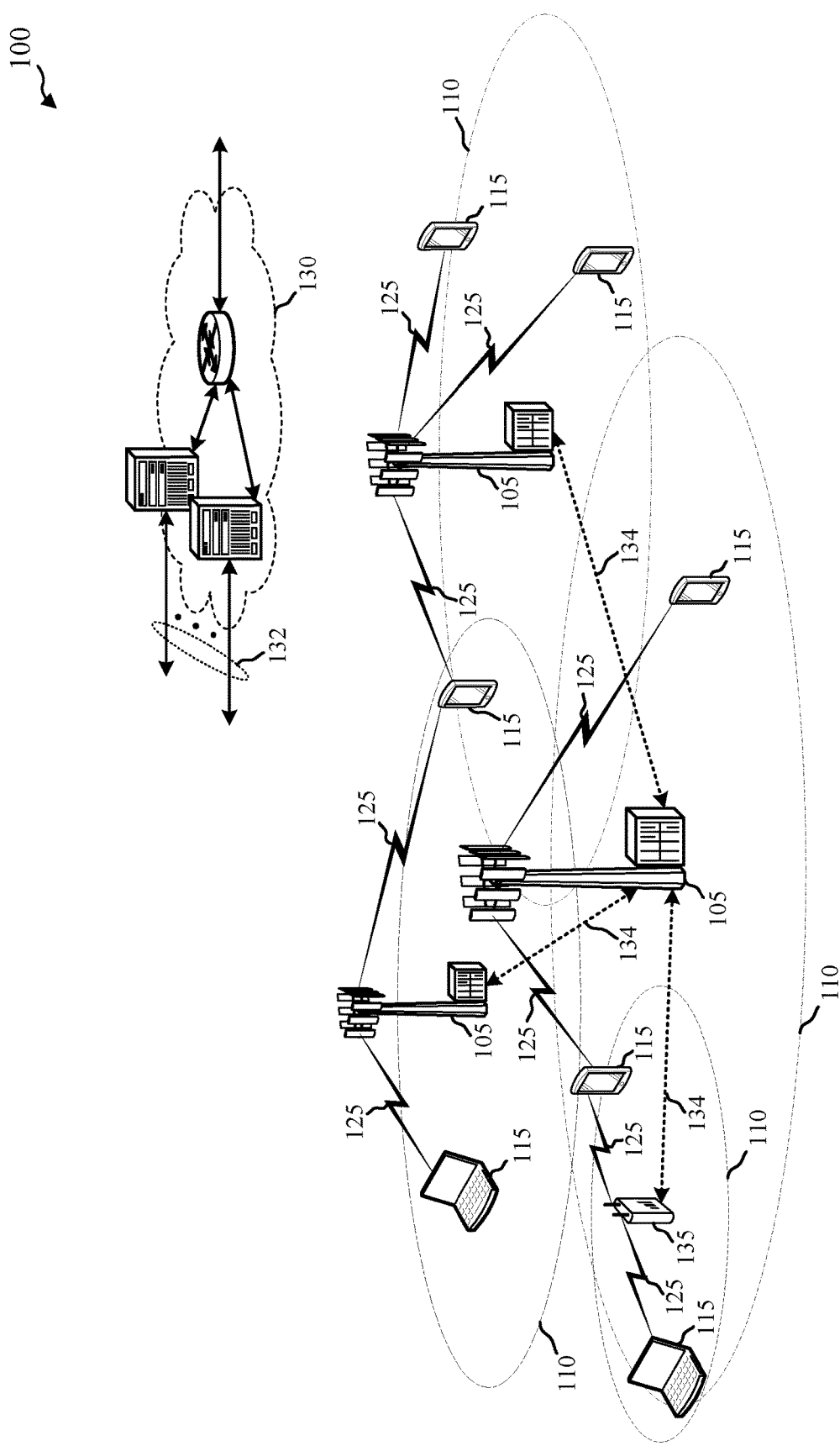
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, small cells 135 (e.g., a type of base station 105), and a core network 130. The core network 130 may provide user authentication, access authorization, tracking, Internet Protocol (IP) connectivity, and other access, routing, or mobility functions. The base stations 105 and small cells 135 may interface with the core network 130 through backhaul links 132 (e.g., S1, etc.) and may perform radio configuration and scheduling for communication with the UEs 115, or may operate under the control of a base station controller (not shown). In various examples, the base stations 105 or small cells 135 may communicate, either directly or indirectly (e.g., through core network 130), with each other over backhaul links 134 (e.g., X1, etc.), which may be wired or wireless communication links.

The base stations 105 or small cells 135 may wirelessly communicate with the UEs 115 via one or more base station or small cell antennas. Each of the base station 105 or small cell 135 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell 135 may be a lower-powered base station, as compared with a macro cell that may operate in the same or different (e.g., licensed, shared, etc.) radio frequency spectrum bands as macro cells. Small cells 135 may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell 135 may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 and small cells 135 may have similar frame timing, and transmissions from different base stations 105 or small cells 135 may be approximately aligned in time. For asynchronous operation, the base stations 105 or small cells 135 may have different frame timing, and transmissions from different base stations 105 or small cells 135 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105, small cells 135, or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 or small cell 135 to a UE 115, or uplink (UL) transmissions, from a UE 115 to a base station 105 or small cell 135. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, small cells 135, or UEs 115 may include multiple antennas for employing antenna diversity schemes to improve communication quality and reliability between base stations 105, small cells 135, and UEs 115. Additionally or alternatively, base stations 105, small cells 135, or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a licensed spectrum (e.g., a radio frequency spectrum licensed to particular users for particular uses) or an unlicensed spectrum (e.g., a radio frequency spectrum that is available for Wi-Fi use, a radio frequency spectrum that is available for use by different radio access technologies, or a radio frequency spectrum that is available for use by multiple MNOs in an equally shared or prioritized manner).

Figure 2:
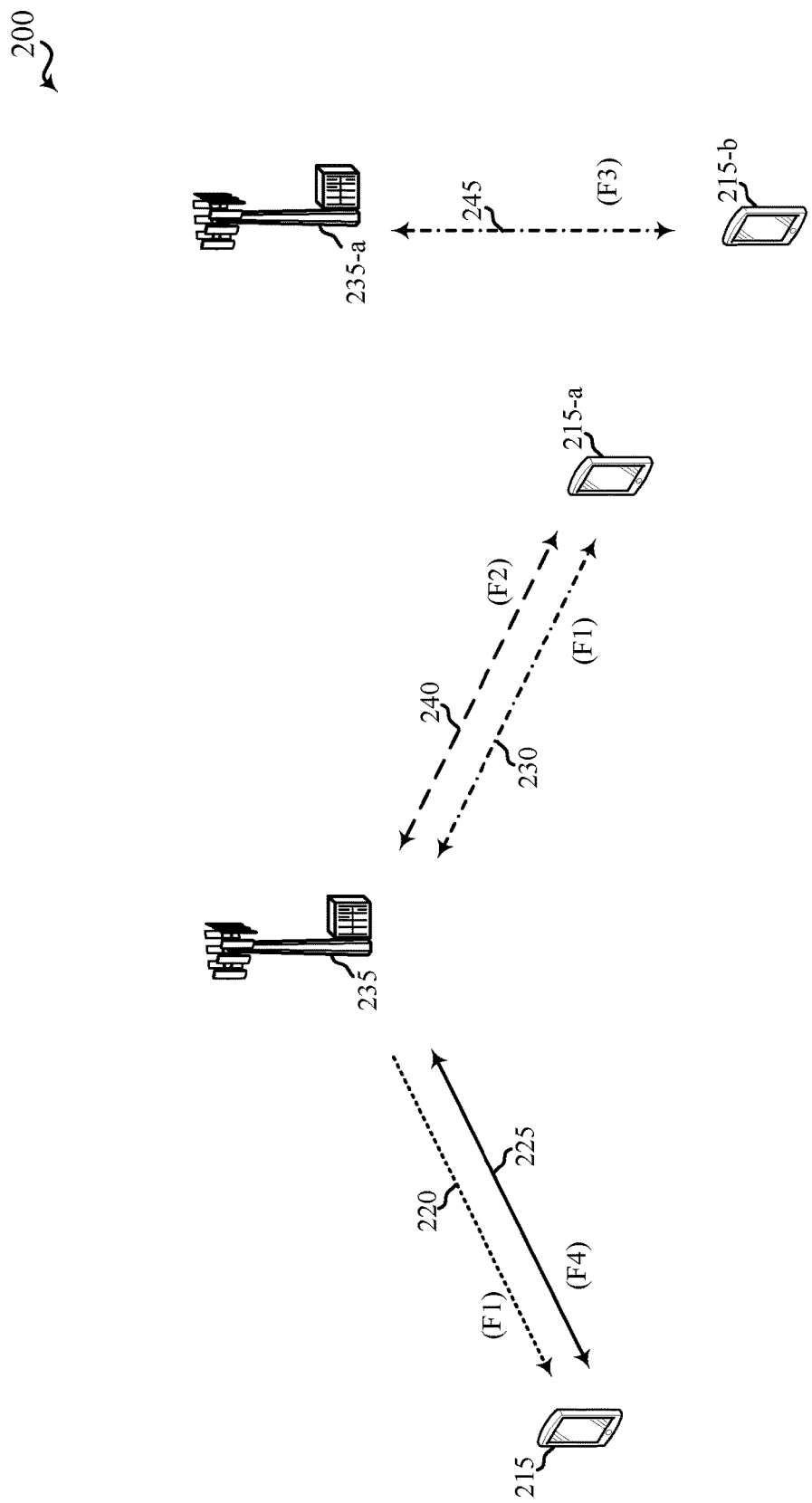
FIG. 2 shows a wireless communication system in which LTE/LTE-A may be deployed under different scenarios using an unlicensed spectrum, in accordance with various aspects of the present disclosure.

FIG. 2 shows a wireless communication system 200 in which LTE/LTE-A may be deployed under different scenarios using an unlicensed spectrum, in accordance with various aspects of the present disclosure. More specifically, FIG. 2 illustrates examples of a supplemental downlink mode (also referred to as a first licensed assisted access mode), a carrier aggregation mode (also referred to as a second licensed assisted access mode), and a standalone mode, in which LTE/LTE-A or an eCC is deployed using an unlicensed spectrum. The wireless communication system 200 may be an example of portions of the wireless communication system 100 described with reference to FIG. 1. Moreover, a first small cell 235 and a second small cell 235-a may be examples of aspects of one or more of the small cells 135 or base stations 105 described with reference to FIG. 1, while a first UE 215, a second UE 215-a, and a third UE 215-b may be examples of aspects of one or more of the UEs 115 described with reference to FIG. 1.

In the example of the supplemental downlink mode (e.g., the first licensed assisted access mode) in the wireless communication system 200, the first small cell 235 may transmit OFDMA waveforms to the first UE 215 using a downlink channel 220. The downlink channel 220 may be associated with a frequency F1 in an unlicensed spectrum. The first small cell 235 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed spectrum. The downlink channel 220 in the unlicensed spectrum and the first bidirectional link 225 in the licensed spectrum may operate contemporaneously. The downlink channel 220 may provide a downlink capacity offload for the first small cell 235. In some examples, the downlink channel 220 may be used for unicast services (e.g., addressed to one UE) or for multicast services (e.g., addressed to several UEs). This scenario may occur with any service provider (e.g., a MNO) that uses a licensed spectrum and needs to relieve some of the traffic or signaling congestion.

In the example of the carrier aggregation mode (e.g., the second licensed assisted access mode) in the wireless communication system 200, the first small cell 235 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the unlicensed spectrum. The first small cell 235 may also transmit OFDMA waveforms to the second UE 215-*a* using a third bidirectional link 240 and may receive SC-FDMA waveforms from the second UE 215-*a* using the third bidirectional link 240. The third bidirectional link 240 may be associated with a frequency F2 in a licensed spectrum. The third bidirectional link 240 may provide a downlink and uplink capacity offload for the first small cell 235. Like the supplemental downlink mode (e.g., the first licensed assisted access mode) described above, this scenario may occur with any service provider (e.g., MNO) that uses a licensed spectrum and needs to relieve some of the traffic or signaling congestion.

As described above, one type of service provider that may benefit from the capacity offload offered by using LTE/LTE-A in an unlicensed spectrum is a traditional MNO having access rights to an LTE/LTE-A licensed spectrum. For these service providers, an operational example may include a bootstrapped mode (e.g., supplemental downlink, carrier aggregation) that uses the LTE/LTE-A primary component carrier (PCC) on the licensed spectrum and at least one secondary component carrier (SCC) on the unlicensed spectrum.

In the carrier aggregation mode, data and control may, for example, be communicated in the dedicated radio frequency spectrum band (e.g., via first bidirectional link 225 or third bidirectional link 240) while data may, for example, be communicated in the shared radio frequency spectrum band (e.g., via second bidirectional link 230). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second small cell 235-*a* may transmit OFDMA waveforms to the third UE 215-*b* using a bidirectional link 245 and may receive OFDMA waveforms, SC-FDMA waveforms, or resource block interleaved FDMA waveforms from the third UE 215-*b* using the bidirectional link 245. The bidirectional link 245 may be associated with the frequency F3 in the unlicensed spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed spectrum.

In some examples, a transmitting apparatus such as one of the base stations 105 or small cells 135, 235, or 235-*a* described with reference to FIG. 1 or 2, or one of the UEs 115, 215, 215-*a*, or 215-*b* described with reference to FIG. 1 or 2, may use a gating interval to gain access to a wireless channel of an unlicensed spectrum (e.g., to a physical channel of the unlicensed spectrum). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an extended CCA (eCCA) procedure. The outcome of the CCA procedure or eCCA procedure may indicate to the transmitting apparatus whether a wireless channel of an unlicensed spectrum is available or in use for the gating interval (e.g., an LBT radio frame or transmission burst). When a CCA procedure or eCCA procedure indicates the wireless channel is available for a corresponding LBT radio frame or transmission burst (e.g., "clear" for use), the transmitting apparatus may reserve or use the wireless channel of the unlicensed spectrum during part or all of the LBT radio frame. When a CCA procedure or eCCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or eCCA procedure for some but not other wireless channels in an unlicensed spectrum.

Figure 3:
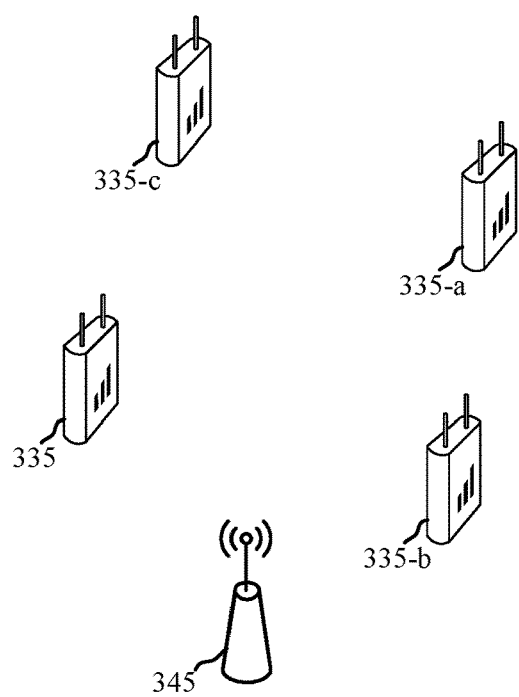
FIG. 3 shows a wireless communication system in which wireless communication devices associated with different MNOs may operate, in accordance with various aspects of the present disclosure.

FIG. 3 shows a wireless communication system in which wireless communication devices associated with different MNOs may operate, in accordance with various aspects of the present disclosure. By way of examples, a first set of wireless communication devices (e.g., a first small cell 335, a second small cell 335-*a*, and a third small cell 335-*b*) may be associated with a first MNO, and a second set of wireless communication devices (e.g., a first Wi-Fi access point 345 and a fourth small cell 335-*c*) may be associated with a second MNO. The first small cell 335, the second small cell 335-*a*, the third small cell 335-*b*, and the fourth small cell 335-*c* may be examples of the small cells 135, 235, or 235-*a* or base stations 105 described with reference to FIG. 1 or 2.

In some examples, each of the small cells associated with the first MNO (e.g., the first small cell 335, the second small cell 335-*a*, and the third small cell 335-*b*) may select a wireless operating channel in an unlicensed spectrum using load-based channel selection techniques. In some examples, a small cell (e.g., the first small cell 335, the second small cell 335-*a*, or the third small cell 335-*b*) may assess the load on each of a plurality of wireless channels by obtaining a plurality of signal strength samples for each of the wireless channels. In some examples, each of the wireless channels may have a same bandwidth. Alternatively, two or more of the wireless channels may have different bandwidths. In some examples, the bandwidth of each wireless channel may be from 1.4 MHz to 20 MHz.

Figure 4:
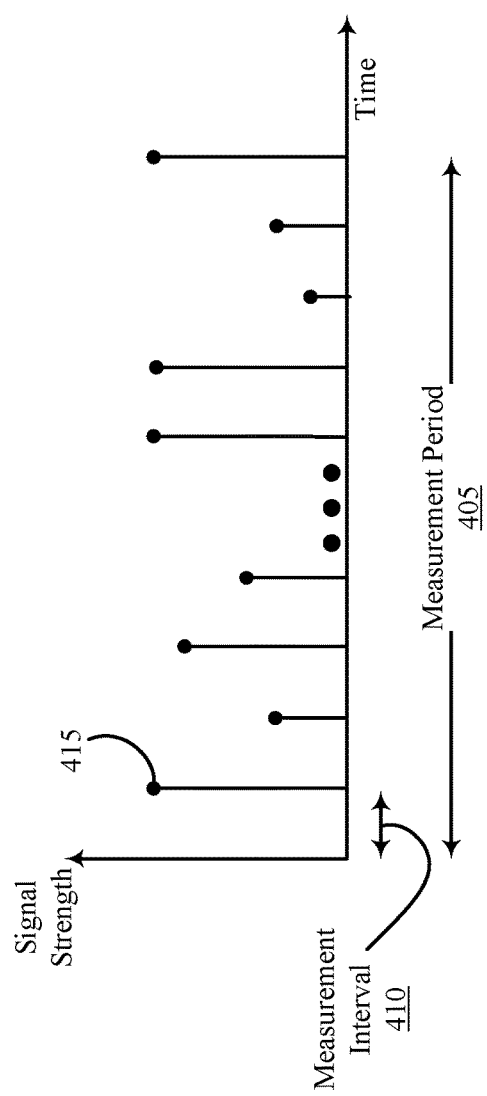
FIG. 4 shows an example graph of signal strength samples obtained by a small cell for a wireless channel over a measurement period, in accordance with various aspects of the present disclosure.

FIG. 4 shows an example graph 400 of signal strength samples obtained by a small cell (e.g., the first small cell 335, the second small cell 335-a, or the third small cell 335-b described with reference to FIG. 3) for a wireless channel over a measurement period 405, in accordance with various aspects of the present disclosure. In some examples, the wireless channel may include a channel of an unlicensed spectrum. The unlicensed spectrum may include a radio frequency spectrum available for Wi-Fi use, a radio frequency spectrum available for use by different radio access technologies, or a radio frequency spectrum available for use by multiple MNOs in an equally shared or prioritized manner. In some examples, the small cell that obtains the signal strength samples may be an example of aspects of the small cells 135, 235, 235-a, 335, 335-a, or 335-b described with reference to FIG. 1, 2, or 3.

The measurement period (or measurement window) 405 may include an integer number of measurement intervals 410, and a signal strength sample 415 may be obtained for each measurement interval 410 such that the number of measurement intervals spanned by the measurement period 405 equals the number of signal strength samples obtained during the measurement period 405 (e.g., if the measurement period 405 has a duration of 40 milliseconds (ms) and the measurement interval 410 has a duration of 1 µs, 40,000 signal strength samples may be obtained during the measurement period 405). In some examples, each signal strength sample may include a received signal strength indicator (RSSI) measurement. The set of signal strength samples acquired during a measurement period may be saved as a vector of signal strength samples.

In some examples, each of the wireless communication devices (e.g., base stations, small cells, and/or UEs) associated with a same MNO is synchronized to the same measurement period and measurement interval. In this manner, all of the wireless communication devices associated with the MNO may cease transmissions on a wireless channel at the same time, and any or all of the wireless communication devices associated with the MNO may obtain a signal strength sample for the wireless channel in the absence of radio frequency (RF) interference caused by other wireless communication devices of the same MNO, and the signal strength sample obtained by a wireless communication device (e.g., by listening to the wireless channel) may represent the energy on the wireless channel as a result of transmissions by wireless communication devices associated with other MNOs.

Figure 5:
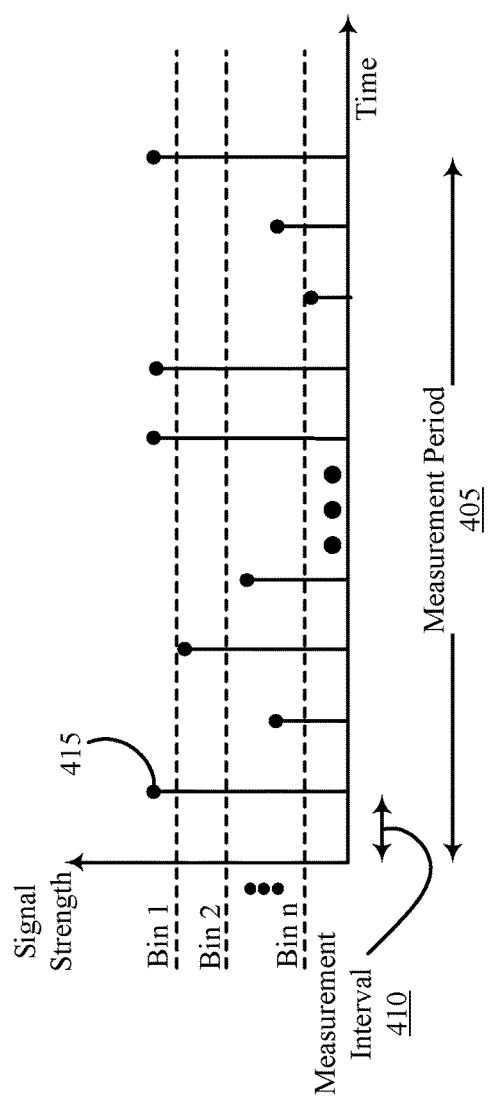
FIG. 5 shows an example graph that associates the signal strength samples obtained in FIG. 4 with a set of predefined signal strength bins, in accordance with various aspects of the present disclosure.

FIG. 5 shows an example graph 500 that associates the signal strength samples obtained in FIG. 4 with a set of predefined signal strength bins, in accordance with various aspects of the present disclosure. In some examples, the signal strength bins may be defined by different RSSI thresholds (e.g., RSSI thresholds 1, 2, . . . n).

The percentage of signal strength samples that fall into a signal strength bin may serve as a load estimate for the signal strength bin. The collection of load estimates determined for a wireless channel may serve as a loading parameter for the wireless channel.

In some examples, different measurement periods may be separated in time, to ensure that a plurality of measurement periods do not all occur during the same traffic burst of another wireless communication device. Separation between measurement periods can help a small cell obtain better load estimates in the presence of bursty traffic.

In some examples, the loading parameter of a wireless operating channel for a small cell may be scaled by the small cell. The scaling may be used to account for the fact that the small cell's use of the wireless channel influences and reshapes the traffic patterns of neighboring wireless communication devices on the wireless channel. The scaling may include multiplying the load estimates of the loading parameter by a scaling factor that tends to cancel the impact of the small cell's own transmissions and mitigate channel load overestimation. In some examples, the scaling factor may be based at least in part on a duty cycle of communications by the small cell over the wireless channel. For example, the scaling factor may be set to 1−small_cell_duty_cycle. Thus, if small_cell_duty_cycle=75%, and a loading parameter (or vector of signal strength samples) shows that the load on a small cell's wireless operating channel is 100%, a scaling factor for the wireless operating channel may be determined to be 25%, and the 100% loading parameter may be multiplied by 25% to obtain an adjusted loading parameter of 25%. In some examples, the loading parameters of non-operating channels may not be scaled (because a small cell's own transmissions do not influence or reshape the traffic patterns of neighboring wireless communication devices on non-operating channels).

In some examples, a plurality of load estimates of a loading parameter may be filtered using an infinite impulse response (IIR) filter. The filtered load estimates of the loading parameter may be used for load-based channel selection.

A small cell may select a wireless operating channel based at least in part on the determined (and possibly scaled or filtered) loading parameters. In some examples, the selection may be made based at least in part on a sum penalty associated with each of the plurality of wireless channels. A sum penalty for a wireless channel of interest may be determined based at least in part on a loading parameter, $P_{Load,i}$, determined for the wireless channel of interest, i. The sum penalty for the wireless channel of interest may also be determined based at least in part on a signal strength of one or more communications associated with a different radio access technology than a radio access technology used by the small cell (e.g., the small cell that is selecting a wireless operating channel) over the wireless channel of interest, a signal strength of one or more communications associated with a same radio access technology as the small cell over the wireless channel of interest, a hidden node parameter, and a channel-specific bias parameter.

In some examples, the sum penalty for a wireless channel may be determined using the equation:

$$P_{Sum,i} = P_{AP,i} + P_{SC,i} + \alpha_{HID} P_{HID} + P_{Load,i} + P_{Bias,i}$$

where $P_{AP,i}$ is a penalty based at least in part on a signal strength of Wi-Fi access points, $P_{SC,i}$ is a penalty based at least in part on a signal strength of other small cells, $\alpha_{HID}$ is a scaling factor, $P_{HID}$ is a penalty based at least in part on a hidden node parameter, and $P_{Bias,i}$ is a penalty associated with a channel-specific bias parameter.

The penalties $P_{AP,i}$, $P_{SC,i}$, and $P_{HID}$ may be determined using various methods, including known methods. For purposes of this description, a "hidden node" is a wireless communication device that transmits within range of a receiving apparatus of a small cell (or other wireless communication device) that is selecting a wireless operating channel, such that the transmissions of the hidden node may affect the receipt of communications at the receiving apparatus, but which transmissions are not directly detectable by the small cell that is selecting a wireless operating channel.

The penalty $P_{Load,i}$ may be determined as a sum of the penalties associated with the signal strength bins represented in a load parameter, and may be determined using the equation:

$$P_{Load,i} = \sum_{j=1}^{N} w_{i,j} \times q_j$$

where j is a signal strength bin index, N is a total number of signal strength bins, $w_{i,j}$ is a weight associated with an i-th wireless channel and j-th signal strength bin, and $q_j$ is a penalty value associated with a j-th signal strength bin. The weight $w_{i,j}$ may be determined as a function of load (percentage signal strength samples) in the j-th signal strength bin. Candidate functions for determining the weight $w_{i,j}$ include linear functions, logistic functions, etc. In one example, each signal strength bin's load estimate may be mapped to a weight $w_{i,j}$ using a logistic function LF(load, $\alpha_{Active}$, k, A), where the midpoint of the LF is a configurable parameter $\alpha_{active}$ and $$LF(x, x_0, k, A) = \frac{A}{1 + e^{-k(x-x_0)}},$$

where the parameters A and k determine the range and steepness of the LF. In some examples, the penalty value $q_j$ may be determined from a penalty table.

The penalty $P_{Bias,i}$ may be used to bias the selection (or non-selection) of a wireless channel i. The penalty $P_{Bias,i}$ may be a constant value. In some examples, the penalty $P_{Bias,i}$ may be used to add a bias in favor of or against operation on Channel 32 (CH32). When a small cell is capable of operating on CH32 without RF degradation, $P_{Bias,i}$ may be used to bias channel selection in favor of CH32 being selected (e.g., $P_{Bias,i}$ may be 0 for 1=32, and $P_{Bias,i}$ may be greater than 0 for other values of i).

FIG. 6 shows an example penalty table 600 that associates a set of signal strength bins with penalties, in accordance with various aspects of the present disclosure. In some examples, the signal strength bins may be defined by different RSSI thresholds. The RSSI thresholds may be associated with corresponding signal strength bins j 605 (e.g., bins 0, 1, 2, 3, 4, 5, and 6), each bin of which is associated with a RSSI range 610 and a default penalty value $q_j$ 615.

In some examples, a small cell may select a new wireless operating channel based at least in part on a first sum penalty associated with the current wireless operating channel is higher than a second sum penalty associated with the new wireless operating channel. In some examples, the new wireless operating channel may be selected because it has the lowest sum penalty of a plurality of wireless channels and/or based on the second sum penalty being lower than the first sum penalty for a minimum period of time (e.g., a hysteresis penalty).

In some examples, a small cell may select a new wireless operating channel based at least in part on a combination of conditions. For example, a small cell may select a new wireless operating channel based at least in part on a medium utilization of the current wireless operating channel by one or more neighboring wireless communication devices (e.g., Wi-Fi devices) satisfying a threshold, and based at least in part on there being a wireless channel having a sum penalty that is lower than the sum penalty associated with the current wireless operating channel. The medium utilization of the wireless operating channel is a use of the wireless operating channel by other wireless communication devices. In some examples, there may be a further condition that the medium utilization of the current wireless operating channel be associated with signal strength samples satisfying an energy detection (ED) threshold and/or a condition that the second sum penalty be lower than the first sum penalty for a minimum period of time (e.g., a hysteresis penalty).

When the wireless communication devices (e.g., base stations, small cells, and/or UEs) associated with a same MNO are synchronized to the same measurement period and measurement interval, and none of the wireless communication devices transmit on a wireless channel when one or more of the wireless communication devices obtain signal strength samples for the wireless channel, the energy observed in a set of signal strength samples (or in a loading parameter) is related to the transmissions of wireless communication devices associated with other MNOs (e.g., small cells or Wi-Fi transmitters of other MNOs, or wireless communication devices of MNOs employing different radio access technologies). In some examples, a Wi-Fi medium utilization estimate may be reported by a Wi-Fi sniffer of a small cell that is determining the load on a wireless channel, and if signal strength samples indicate that the load on the wireless channel is higher than the Wi-Fi medium utilization estimate, the load on the wireless channel may be determined to be attributable to a small cell deployment of a different MNO.

In some examples, a small cell may scan one or more of a plurality of wireless channels (e.g., CH36) for energy or energy signatures indicative of Wi-Fi access point use, or for energy or energy signatures indicative of use by neighboring small cells, but not for load detection. In other examples, a small cell may scan one or more of the plurality of channels (e.g., CH32) for energy or energy signatures indicative of use by neighboring small cells and for load detection, but not for energy or energy signatures indicatives of Wi-Fi access point use. Other combinations of scans, such as scans for energy or energy signatures indicative of Wi-Fi access point use, scans for energy or energy signatures indicative of use by neighboring small cells, and scans for load detection, among others, may be utilized in other examples. In these examples, the small cell may not cease RF transmissions to scan one or more wireless channels, thereby enabling the small cell to achieve a maximum throughput while ceasing RF transmissions to scan one or more other wireless channels.

Figure 7:
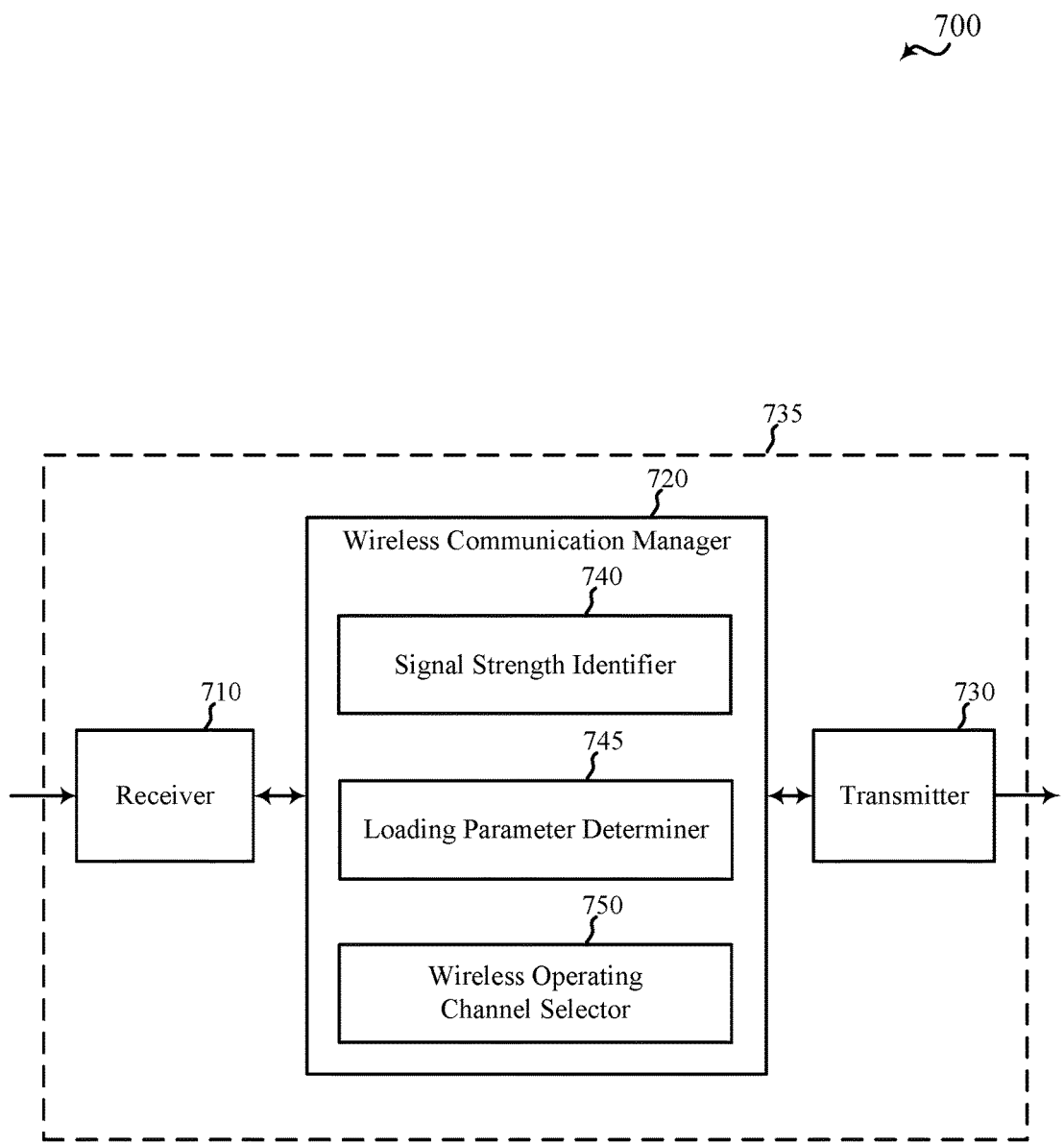
FIG. 7 shows a block diagram of an apparatus for use in wireless communication, in accordance with various aspects of the present disclosure.

FIG. 7 shows a block diagram 700 of an apparatus 735 for use in wireless communication, in accordance with various aspects of the present disclosure. The apparatus 735 may be an example of aspects of one or more of the small cells 135, 235, 235-a, 335, 335-a, or 335-b described with reference to FIG. 1, 2, or 3, aspects of one or more of the base stations 105 described with reference to FIG. 1, or aspects of one or more of the UEs 115, 215, 215-a, or 215-b described with reference to FIG. 1 or 2. The apparatus 735 may also be or include a processor. The apparatus 735 may include a receiver 710, a wireless communication manager 720, or a transmitter 730. Each of these components may be in communication with each other.

The components of the apparatus 735 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over a licensed spectrum (e.g., a radio frequency spectrum licensed to particular users for particular uses) or an unlicensed spectrum (e.g., a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the unlicensed spectrum may be used for LTE/LTE-A communications, as described, for example, with reference to FIG. 1, 2, 3, 4, 5, or 6. The receiver 710 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the unlicensed spectrum.

In some examples, the transmitter 730 may include at least one RF transmitter, such as at least one RF transmitter operable to transmit over the licensed spectrum or the unlicensed spectrum. The transmitter 730 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the unlicensed spectrum.

In some examples, the wireless communication manager 720 may be used to manage one or more aspects of wireless communication for the apparatus 735. In some examples, part of the wireless communication manager 720 may be incorporated into or shared with the receiver 710 or the transmitter 730. In some examples, the wireless communication manager 720 may include a signal strength identifier 740, a loading parameter determiner 745, or a wireless operating channel selector 750.

The signal strength identifier 740 may be used to obtain a plurality of signal strength samples for a first wireless channel during a measurement period. In some examples, the first wireless channel may include a channel of an unlicensed spectrum, and the apparatus 735 may be associated with a MNO using the unlicensed spectrum. The loading parameter determiner 745 may be used to determine a loading parameter of the first wireless channel based at least in part on a distribution of the signal strength samples for the first wireless channel among a set of predefined signal strength bins. The wireless operating channel selector 750 may be used to select a wireless operating channel based at least in part on the determined loading parameter of the first wireless channel.

Figure 8:
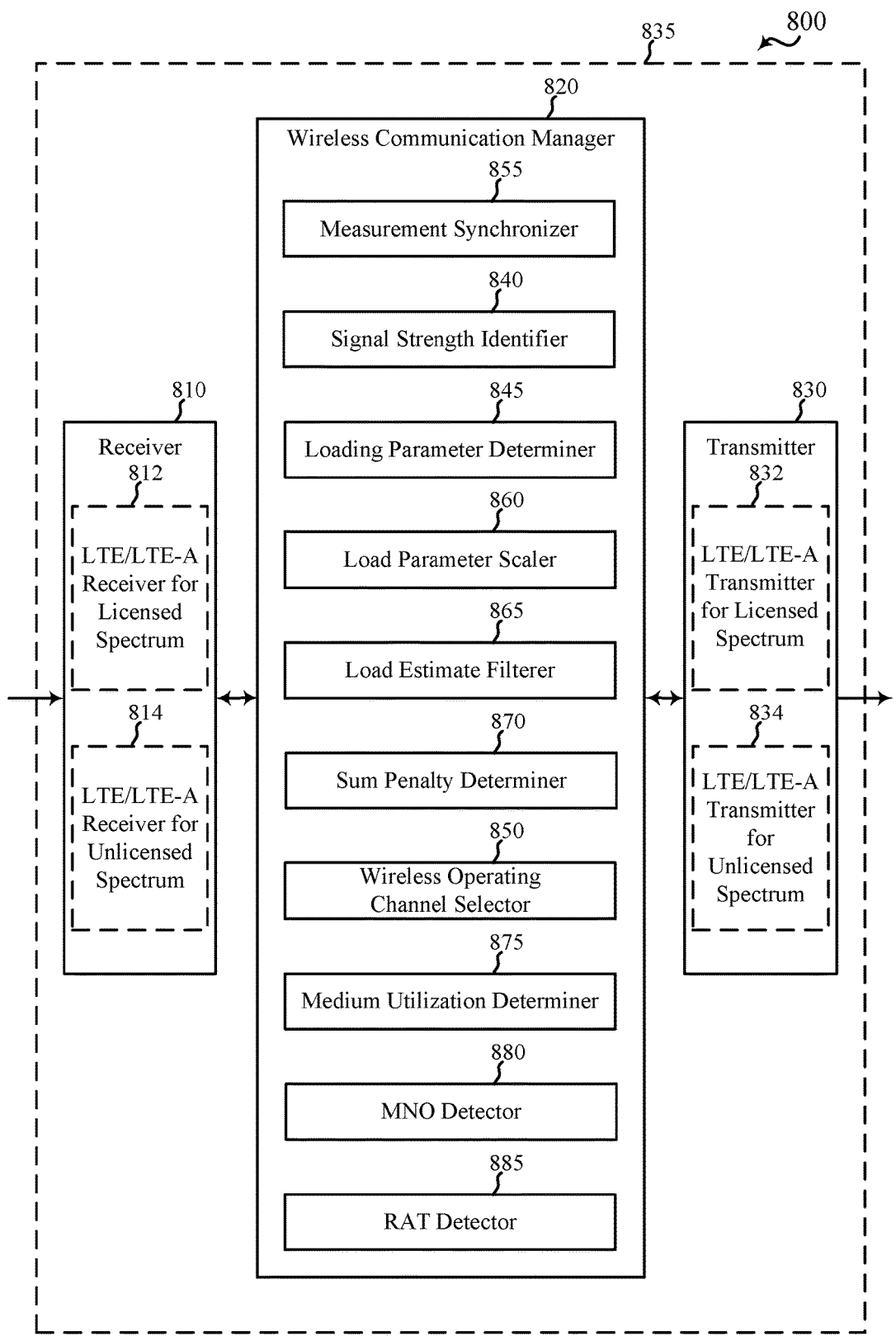
FIG. 8 shows a block diagram of an apparatus for use in wireless communication, in accordance with various aspects of the present disclosure.

FIG. 8 shows a block diagram 800 of an apparatus 835 for use in wireless communication, in accordance with various aspects of the present disclosure. The apparatus 835 may be an example of aspects of one or more of the small cells 135, 235, 235-a, 335, 335-a, or 335-b described with reference to FIG. 1, 2, or 3, aspects of one or more of the base stations 105 described with reference to FIG. 1, aspects of one or more of the UEs 115, 215, 215-a, or 215-b described with reference to FIG. 1 or 2, or aspects of the apparatus 735 described with reference to FIG. 7. The apparatus 835 may also be or include a processor. The apparatus 835 may include a receiver 810, a wireless communication manager 820, or a transmitter 830. Each of these components may be in communication with each other.

The components of the apparatus 835 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a licensed spectrum (e.g., a radio frequency spectrum licensed to particular users for particular uses) or an unlicensed spectrum (e.g., a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the unlicensed spectrum may be used for LTE/LTE-A communications, as described, for example, with reference to FIG. 1, 2, 3, 4, 5, or 6. The receiver 810 may in some cases include separate receivers for the licensed spectrum and the unlicensed spectrum. The separate receivers may, in some examples, take the form of an LTE/LTE-A receiver for communicating over the licensed spectrum (e.g., LTE/LTE-A receiver for licensed spectrum 812), and an LTE/LTE-A receiver for communicating over the unlicensed spectrum (e.g., LTE/LTE-A receiver for unlicensed spectrum 814). The receiver 810, including the LTE/LTE-A receiver for licensed spectrum 812 or the LTE/LTE-A receiver for unlicensed spectrum 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed spectrum or the unlicensed spectrum.

In some examples, the transmitter 830 may include at least one RF transmitter, such as at least one RF transmitter operable to transmit over the licensed spectrum or the unlicensed spectrum. The transmitter 830 may in some cases include separate transmitters for the licensed spectrum and the unlicensed spectrum. The separate transmitters may, in some examples, take the form of an LTE/LTE-A transmitter for communicating over the licensed spectrum (e.g., LTE/LTE-A transmitter for licensed spectrum 832), and an LTE/LTE-A transmitter for communicating over the unlicensed spectrum (e.g., LTE/LTE-A transmitter for unlicensed spectrum 834). The transmitter 830, including the LTE/LTE-A transmitter for licensed spectrum 832 or the LTE/LTE-A transmitter for unlicensed spectrum 834, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the unlicensed spectrum.

In some examples, the wireless communication manager 820 may be used to manage one or more aspects of wireless communication for the apparatus 835. In some examples, part of the wireless communication manager 820 may be incorporated into or shared with the receiver 810 or the transmitter 830. In some examples, the wireless communication manager 820 may include a measurement synchronizer 855, a signal strength identifier 840, a loading parameter determiner 845, a loading parameter scaler 860, a load estimate filterer 865, a sum penalty determiner 870, a wireless operating channel selector 850, a medium utilization determiner 875, a MNO detector 880, or a RAT detector 885.

The measurement synchronizer 855 may be used to synchronize a measurement period among multiple wireless communication devices associated with the same MNO as the apparatus 835. The signal strength identifier 840 may be used to obtain a plurality of signal strength samples for a first wireless channel during the measurement period. In some examples, the first wireless channel may include a channel of an unlicensed spectrum, and the apparatus 835 may be associated with a MNO using the unlicensed spectrum.

The loading parameter determiner 845 may be used to determine a loading parameter of the first wireless channel based at least in part on a distribution of the signal strength samples for the first wireless channel among a set of predefined signal strength bins. The loading parameter scaler 860 may be used to optionally scale the determined loading parameter of the first wireless channel based at least in part on a duty cycle of communications by the apparatus 835 over the first wireless channel. In some examples, the loading parameter of the first wireless channel may be scaled when the first wireless channel is a current wireless operating channel of the apparatus 835, but may not be scaled when the first wireless channel is not a current wireless operating channel of the apparatus 835. The load estimate filterer 865 may be used to filter a plurality of load estimates of the loading parameter using an IIR filter.

The sum penalty determiner 870 may be used to determine a sum penalty associated with the first wireless channel. The sum penalty for the first wireless channel may be determined based at least in part on the loading parameter determined for the first wireless channel. In some examples, the sum penalty may also be determined based at least in part on one or more additional parameters from a group consisting of: a signal strength of one or more communications associated with a different radio access technology than a radio access technology used by the apparatus 835 over the first wireless channel, a signal strength of one or more communications associated with a same radio access technology as the apparatus 835 over the first wireless channel, a hidden node parameter, and a channel-specific bias parameter.

The wireless operating channel selector 850 may be used to select a wireless operating channel based at least in part on the sum penalty determined for the first wireless channel (which sum penalty is based at least in part on the loading parameter determined for the first wireless channel).

The medium utilization determiner 875 may be used to optionally determine a medium utilization of the first wireless channel by one or more neighboring wireless communication devices. The MNO detector 880 may be used to optionally detect a presence of a different MNO on the first wireless channel based at least in part on the determined loading parameter of the first wireless channel. The RAT detector 885 may be used to optionally infer a radio access technology used by the different MNO on the first wireless channel based at least in part on the medium utilization determined by the medium utilization determiner 875.

Figure 9:
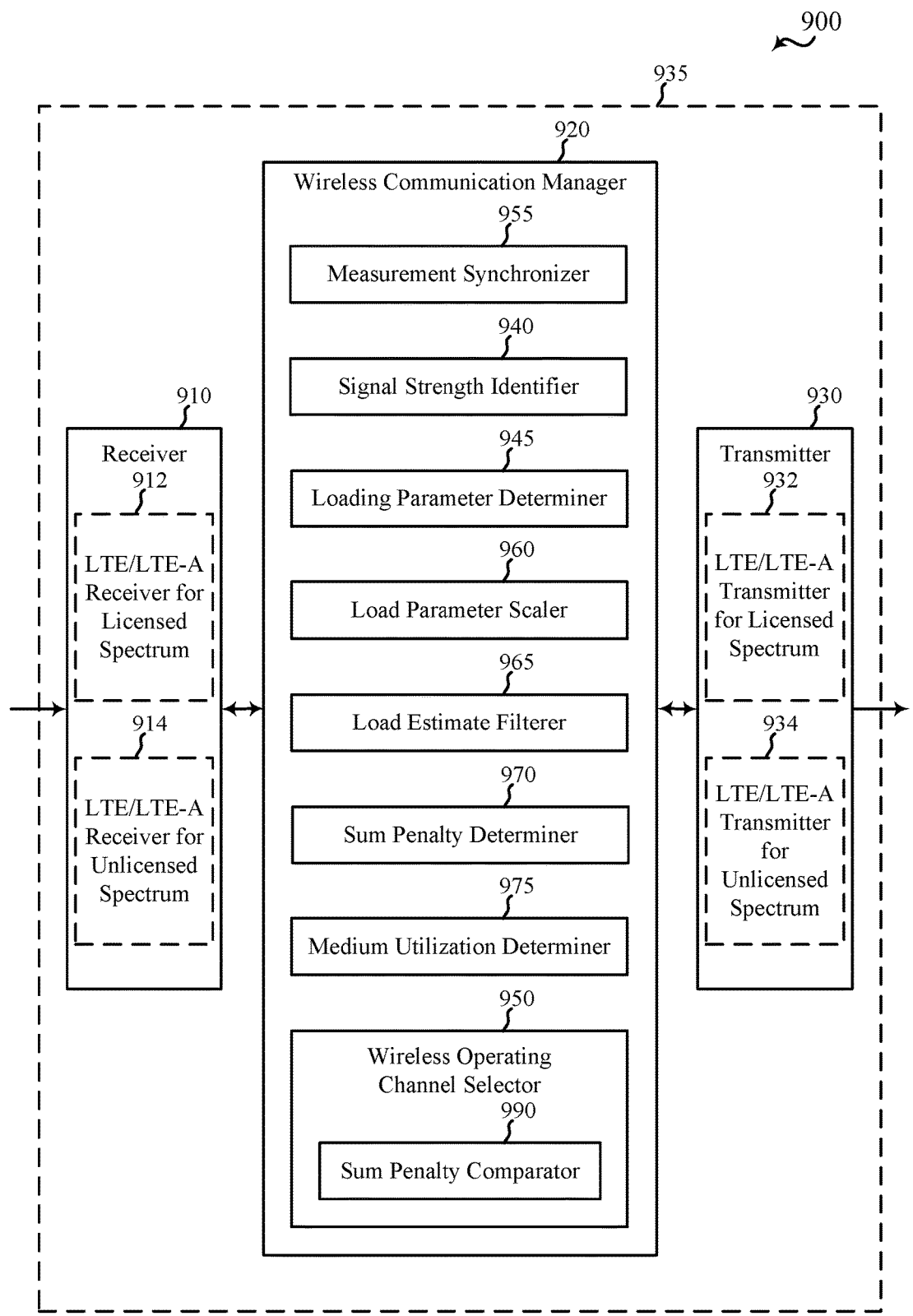
FIG. 9 shows a block diagram of an apparatus for use in wireless communication, in accordance with various aspects of the present disclosure.

FIG. 9 shows a block diagram 900 of an apparatus 935 for use in wireless communication, in accordance with various aspects of the present disclosure. The apparatus 935 may be an example of aspects of one or more of the small cells 135, 235, 235-*a*, 335, 335-*a*, or 335-*b* described with reference to FIG. 1, 2, or 3, aspects of one or more of the base stations 105 described with reference to FIG. 1, aspects of one or more of the UEs 115, 215, 215-*a*, or 215-*b* described with reference to FIG. 1 or 2, or aspects of the apparatus 735 described with reference to FIG. 7. The apparatus 935 may also be or include a processor. The apparatus 935 may include a receiver 910, a wireless communication manager 920, or a transmitter 930. Each of these components may be in communication with each other.

The components of the apparatus 935 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a licensed spectrum (e.g., a radio frequency spectrum licensed to particular users for particular uses) or an unlicensed spectrum (e.g., a radio frequency spectrum available for Wi-Fi use, a radio frequency spectrum available for use by different radio access technologies, or a radio frequency spectrum available for use by multiple MNOs in an equally shared or prioritized manner). In some examples, the licensed spectrum or the unlicensed spectrum may be used for LTE/LTE-A communications, as described, for example, with reference to FIG. 1, 2, 3, 4, 5, or 6. The receiver 910 may in some cases include separate receivers for the licensed spectrum and the unlicensed spectrum. The separate receivers may, in some examples, take the form of an LTE/LTE-A receiver for communicating over the licensed spectrum (e.g., LTE/LTE-A receiver for licensed spectrum 912), and an LTE/LTE-A receiver for communicating over the unlicensed spectrum (e.g., LTE/LTE-A receiver for unlicensed spectrum 914). The receiver 910, including the LTE/LTE-A receiver for licensed spectrum 912 or the LTE/LTE-A receiver for unlicensed spectrum 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed spectrum or the unlicensed spectrum.

In some examples, the transmitter 930 may include at least one RF transmitter, such as at least one RF transmitter operable to transmit over the licensed spectrum or the unlicensed spectrum. The transmitter 930 may in some cases include separate transmitters for the licensed spectrum and the unlicensed spectrum. The separate transmitters may, in some examples, take the form of an LTE/LTE-A transmitter for communicating over the licensed spectrum (e.g., LTE/LTE-A transmitter for licensed spectrum 932), and an LTE/LTE-A transmitter for communicating over the unlicensed spectrum (e.g., LTE/LTE-A transmitter for unlicensed spectrum 934). The transmitter 930, including the LTE/LTE-A transmitter for licensed spectrum 932 or the LTE/LTE-A transmitter for unlicensed spectrum 934, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed spectrum or the unlicensed spectrum.

In some examples, the wireless communication manager 920 may be used to manage one or more aspects of wireless communication for the apparatus 935. In some examples, part of the wireless communication manager 920 may be incorporated into or shared with the receiver 910 or the transmitter 930. In some examples, the wireless communication manager 920 may include a measurement synchronizer 955, a signal strength identifier 940, a loading parameter determiner 945, a loading parameter scaler 960, a load estimate filterer 965, a sum penalty determiner 970, a medium utilization determiner 975, or a wireless operating channel selector 950.

The measurement synchronizer 955 may be used to synchronize a measurement period among multiple wireless communication devices associated with the same MNO as the apparatus 935. The signal strength identifier 940 may be used to obtain a plurality of signal strength samples for a plurality of wireless channels during the measurement period. In some examples, the first wireless channel may include a channel of an unlicensed spectrum, and the apparatus 935 may be associated with a MNO using the unlicensed spectrum. In some examples, signal strength samples for different wireless channels may be obtained at different times and/or different measurement periods may be provided (and synchronized) for different wireless channels.

The loading parameter determiner 945 may be used to determine a separate loading parameter of each of the plurality of wireless channels. Each loading parameter may be based at least in part on a distribution of the signal strength samples for a wireless channel among a set of predefined signal strength bins. The loading parameter scaler 960 may be used to scale the determined loading parameter of a current wireless operating channel of the apparatus 935, based at least in part on a duty cycle of communications by the apparatus 935 over the current wireless operating channel. In some examples, the determined loading parameter(s) of other wireless channels may not be scaled. The load estimate filterer 965 may be used to filter a plurality of load estimates of each loading parameter using an IIR filter.

The sum penalty determiner 970 may be used to determine a sum penalty associated with each of the plurality of wireless channels. The sum penalty for a wireless channel of interest may be determined based at least in part on a loading parameter determined for the wireless channel of interest. In some examples, the sum penalty for the wireless channel of interest may also be determined based at least in part on one or more additional parameters from a group consisting of: a signal strength of one or more communications associated with a different radio access technology than a radio access technology used by the apparatus 935 over the wireless channel of interest, a signal strength of one or more communications associated with a same radio access technology as the apparatus 935 over the wireless channel of interest, a hidden node parameter, and a channel-specific bias parameter.

The medium utilization determiner 975 may be used to optionally determine a medium utilization of the current wireless operating channel (e.g., a first wireless channel used by the apparatus 935) by one or more neighboring wireless communication devices.

The wireless operating channel selector 950 may be used to select a wireless operating channel based at least in part on the sum penalties determined for the wireless channels (which sum penalties are based at least in part on the loading parameters determined for the wireless channels). In some examples, the wireless operating channel selector 950 may include a sum penalty comparator 990. The sum penalty comparator 990 may be used to compare the sum penalties of the wireless channels. Upon determining that one or more conditions are met, the wireless operating channel selector 950 may switch the current wireless operating channel (e.g., the first wireless channel) to another wireless channel (e.g., to a second wireless channel). Upon determining that one or more of the conditions are not met, the apparatus 935 may continue using the current wireless operating channel (e.g., the first wireless channel).

In some examples of the apparatus 935, the one or more conditions evaluated by the wireless operating channel selector 950 may include a condition that a first sum penalty associated with the current wireless operating channel (e.g., the first wireless channel) is higher than a second sum penalty associated with the second wireless channel. In some examples, the one or more conditions may include a condition that the second wireless channel have the lowest sum penalty of the plurality of wireless channels and/or that the second sum penalty be lower than the first sum penalty for a minimum period of time (e.g., a hysteresis penalty). In some examples, the one or more conditions may also include a condition that the medium utilization of the current wireless operating channel (e.g., of the first wireless channel) by the one or more neighboring wireless communication devices satisfies a threshold. In these latter examples, the one or more conditions may also include a condition that the medium utilization of the current wireless operating channel be associated with signal strength samples satisfying an energy detection (ED) threshold and/or a condition that the second sum penalty be lower than the first sum penalty for a minimum period of time (e.g., a hysteresis penalty).

In some examples of the apparatus 935, the wireless communication manager 920 may perform a radio access technology-specific detection operation (e.g., a Wi-Fi detection operation) for one or more of the plurality of wireless channels, but may disable the radio access technology-specific detection operation for at least a subset of the plurality of wireless channels.

Figure 10:
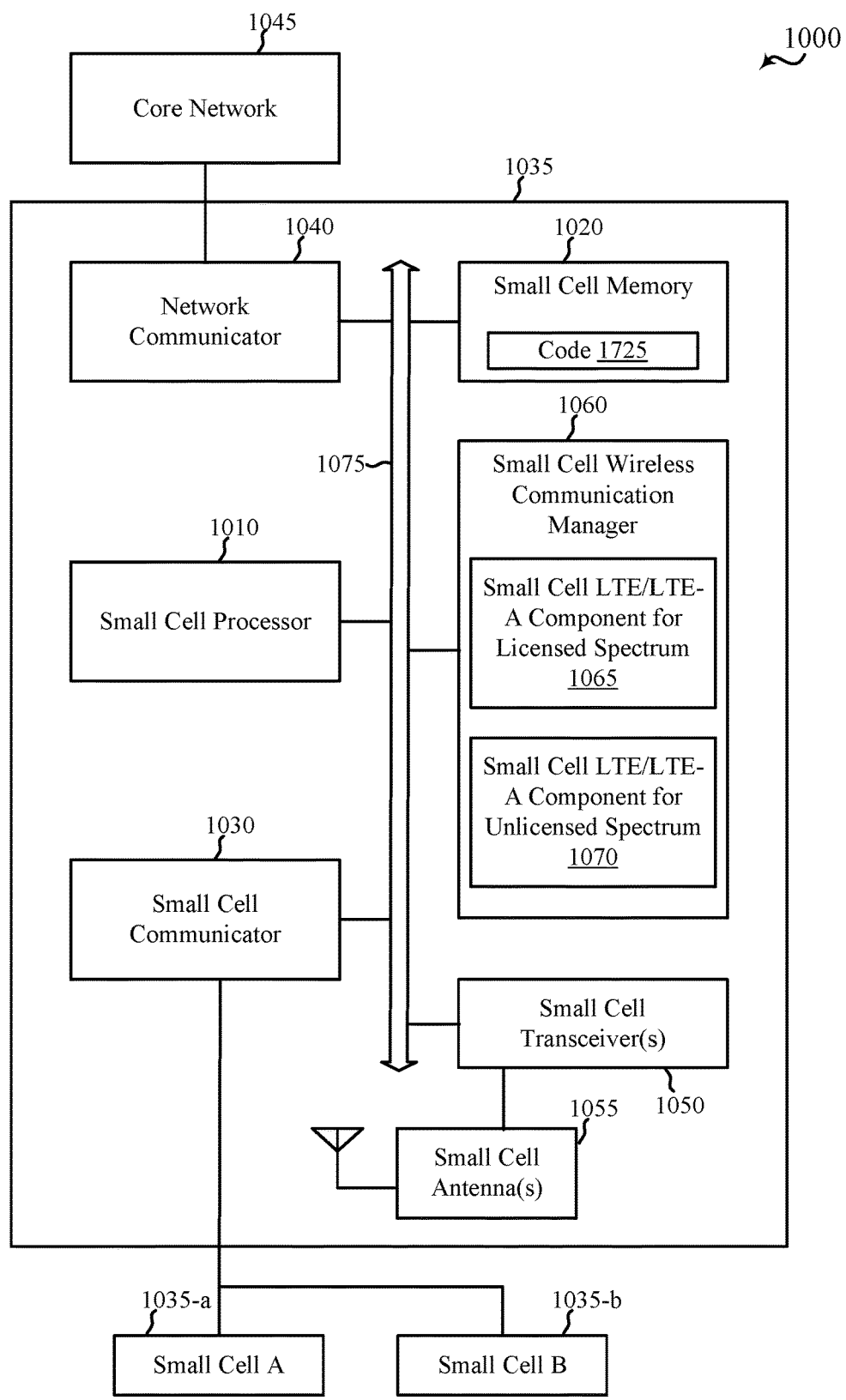
FIG. 10 shows a block diagram of a small cell for use in wireless communication, in accordance with various aspects of the present disclosure.

FIG. 10 shows a block diagram 1000 of a small cell 1035 for use in wireless communication, in accordance with various aspects of the present disclosure. In some examples, the small cell 1035 may be an example of one or more aspects of the small cells 135, 235, 235-a, 335, 335-a, or 335-b described with reference to FIG. 1, 2, or 3, aspects of one or more of the base stations 105 described with reference to FIG. 1, or aspects of one or more of the apparatuses 735, 835, or 935 described with reference to FIG. 7, 8, or 9.

The small cell 1035 may be configured to implement or facilitate at least some of the small cell or base station techniques and functions described with reference to FIG. 1, 2, 3, 4, 5, 6, 7, 8, or 9.

The small cell 1035 may include a small cell processor 1010, a small cell memory 1020, at least one small cell transceiver (represented by small cell transceiver(s) 1050), at least one small cell antenna (represented by small cell antenna(s) 1055), or a small cell wireless communication manager 1060. The small cell 1035 may also include one or more of a small cell communicator 1030 or a network communicator 1040. Each of these components may be in communication with each other, directly or indirectly, over one or more buses 1075.

The small cell memory 1020 may include random access memory (RAM) or read-only memory (ROM). The small cell memory 1020 may store computer-readable, computer-executable code 1025 containing instructions that are configured to, when executed, cause the small cell processor 1010 to perform various functions described herein related to wireless communication, including, for example, selecting a wireless operating channel based at least in part on loading parameters of a plurality of wireless channels and/or sum penalties associated with the wireless channels. Alternatively, the computer-executable code 1025 may not be directly executable by the small cell processor 1010 but be configured to cause the small cell 1035 (e.g., when compiled and executed) to perform various of the functions described herein.

The small cell processor 1010 may include an intelligent hardware device, e.g., a central processing unit (CPU), a microcontroller, an ASIC, etc. The small cell processor 1010 may process information received through the small cell transceiver(s) 1050, the small cell communicator 1030, or the network communicator 1040. The small cell processor 1010 may also process information to be sent to the transceiver(s) 1050 for transmission through the antenna(s) 1055, to the small cell communicator 1030, for transmission to one or more other small cell (e.g., small cell 1035-*a* and/or small cell 1035-*b*), or to the network communicator 1040 for transmission to a core network 1045, which may be an example of one or more aspects of the core network 130 described with reference to FIG. 1. The small cell processor 1010 may handle, alone or in connection with the small cell wireless communication manager 1060, various aspects of communicating over (or managing communications over) a licensed spectrum or an unlicensed spectrum. The licensed spectrum may include a radio frequency spectrum licensed to particular users for particular uses. The unlicensed spectrum may include a radio frequency spectrum available for Wi-Fi use, a radio frequency spectrum available for use by different radio access technologies, or a radio frequency spectrum available for use by multiple MNOs in an equally shared or prioritized manner.

The small cell transceiver(s) 1050 may include a modem configured to modulate packets and provide the modulated packets to the small cell antenna(s) 1055 for transmission, and to demodulate packets received from the small cell antenna(s) 1055. The small cell transceiver(s) 1050 may, in some examples, be implemented as one or more small cell transmitters and one or more separate small cell receivers. The small cell transceiver(s) 1050 may support communications in the licensed spectrum or the unlicensed spectrum. The small cell transceiver(s) 1050 may be configured to communicate bi-directionally, via the small cell antenna(s) 1055, with one or more UEs or apparatuses, such as one or more of the UEs 115, 215, 215-*a*, or 215-*b* described with reference to FIG. 1 or 2, or one or more of the apparatuses 735, 835, or 935 described with reference to FIG. 7, 8, or 9. The small cell 1035 may, for example, include multiple small cell antennas 1055 (e.g., an antenna array). The small cell 1035 may communicate with the core network 1045 through the network communicator 1040. The small cell 1035 may also communicate with other small cells (or with base stations), such as the small cell 1035-*a* and/or the small cell 1035-*b*, using the small cell communicator 1030.

The small cell wireless communication manager 1060 may be configured to perform or control some or all of the techniques or functions described with reference to FIG. 1, 2, 3, 4, 5, 6, 7, 8, or 9 related to wireless communication over the licensed spectrum or the unlicensed spectrum. For example, the small cell wireless communication manager 1060 may be configured to support a supplemental downlink mode (e.g., a licensed assisted access mode), a carrier aggregation mode, or a standalone mode using the licensed spectrum or the unlicensed spectrum. The small cell wireless communication manager 1060 may include a small cell LTE/LTE-A component for licensed spectrum 1065 configured to handle LTE/LTE-A communications in the licensed spectrum, and a small cell LTE/LTE-A component for unlicensed spectrum 1070 configured to handle LTE/LTE-A communications in the unlicensed spectrum. The small cell wireless communication manager 1060, or portions of it, may include a processor, or some or all of the functions of the small cell wireless communication manager 1060 may be performed by the small cell processor 1010 or in connection with the small cell processor 1010. In some examples, the small cell wireless communication manager 1060 may be an example of the wireless communication manager 720, 820, or 920 described with reference to FIG. 7, 8, or 9.

Figure 11:
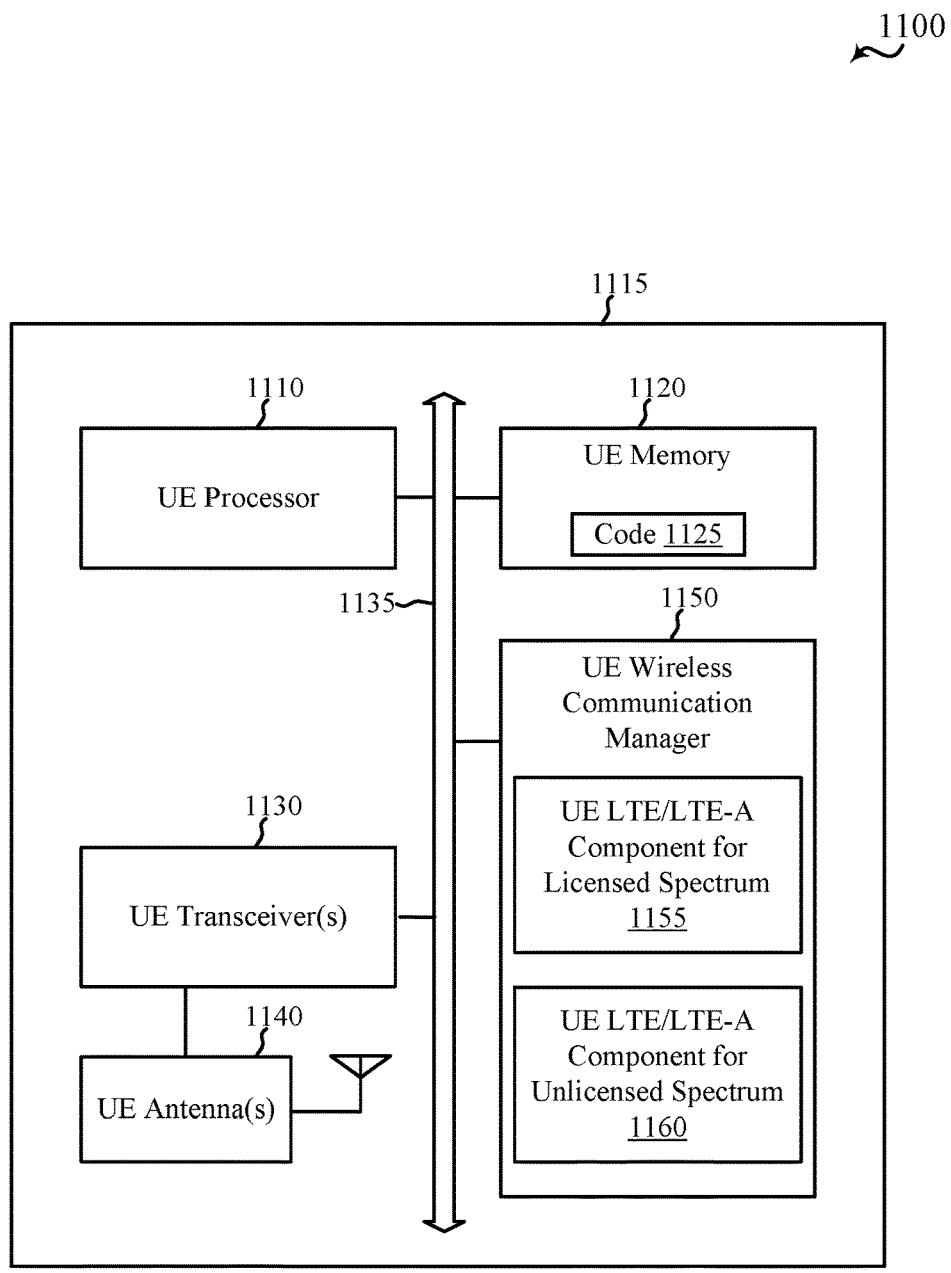
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115, 215, 215-*a*, or 215-*b* described with reference to FIG. 1 or 2, or aspects of one or more of the apparatuses 735, 835, or 935 described with reference to FIG. 7, 8, or 9. The UE 1115 may be configured to implement at least some of the UE or apparatus techniques and functions described with reference to FIG. 1, 2, 3, 4, 5, 6, 7, 8, or 9.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more buses 1135.

The UE memory 1120 may include RAM or ROM. The UE memory 1120 may store computer-readable, computer-executable code 1125 containing instructions that are configured to, when executed, cause the UE processor 1110 to perform various functions described herein related to wireless communication, including, for example, selecting a wireless operating channel based at least in part on loading parameters of a plurality of wireless channels and/or sum penalties associated with the wireless channels. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device, e.g., a CPU, a microcontroller, an ASIC, etc. The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) a licensed spectrum or an unlicensed spectrum. The licensed spectrum may include a radio frequency spectrum licensed to particular users for particular uses. The unlicensed spectrum may include a radio frequency spectrum available for Wi-Fi use, a radio frequency spectrum available for use by different radio access technologies, or a radio frequency spectrum available for use by multiple MNOs in an equally shared or prioritized manner.

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitters and one or more separate UE receivers. The UE transceiver(s) 1130 may support communications in the licensed spectrum or the unlicensed spectrum. The UE transceiver(s) 1130 may be configured to communicate bi-directionally, via the UE antenna(s) 1140, with one or more small cells, base stations, or apparatuses, such as one or more of the small cells 135, 235, 235-a, 335, 335-a, 335-b, or 1035 described with reference to FIG. 1, 2, 3, or 10, one or more of the base stations 105 described with reference to FIG. 1, or one or more of the apparatuses 735, 835, or 935 described with reference to FIG. 7, 8, or 9. While the UE 1115 may include a single UE antenna, there may be examples in which the UE 1115 may include multiple UE antennas 1140.

The UE wireless communication manager 1150 may be configured to perform or control some or all of the UE or apparatus techniques or functions described with reference to FIG. 1, 2, 3, 4, 5, 6, 7, 8, or 9 related to wireless communication over the licensed spectrum or the unlicensed spectrum. For example, the UE wireless communication manager 1150 may be configured to support a supplemental downlink mode (e.g., a licensed assisted access mode), a carrier aggregation mode, or a standalone mode using the licensed spectrum or the unlicensed spectrum. The UE wireless communication manager 1150 may include a UE LTE/LTE-A component for licensed spectrum 1155 configured to handle LTE/LTE-A communications in the licensed spectrum, and a UE LTE/LTE-A component for unlicensed spectrum 1160 configured to handle LTE/LTE-A communications in the unlicensed spectrum. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the wireless communication manager 720, 820, or 920 described with reference to FIG. 7, 8, or 9.

Figure 12:
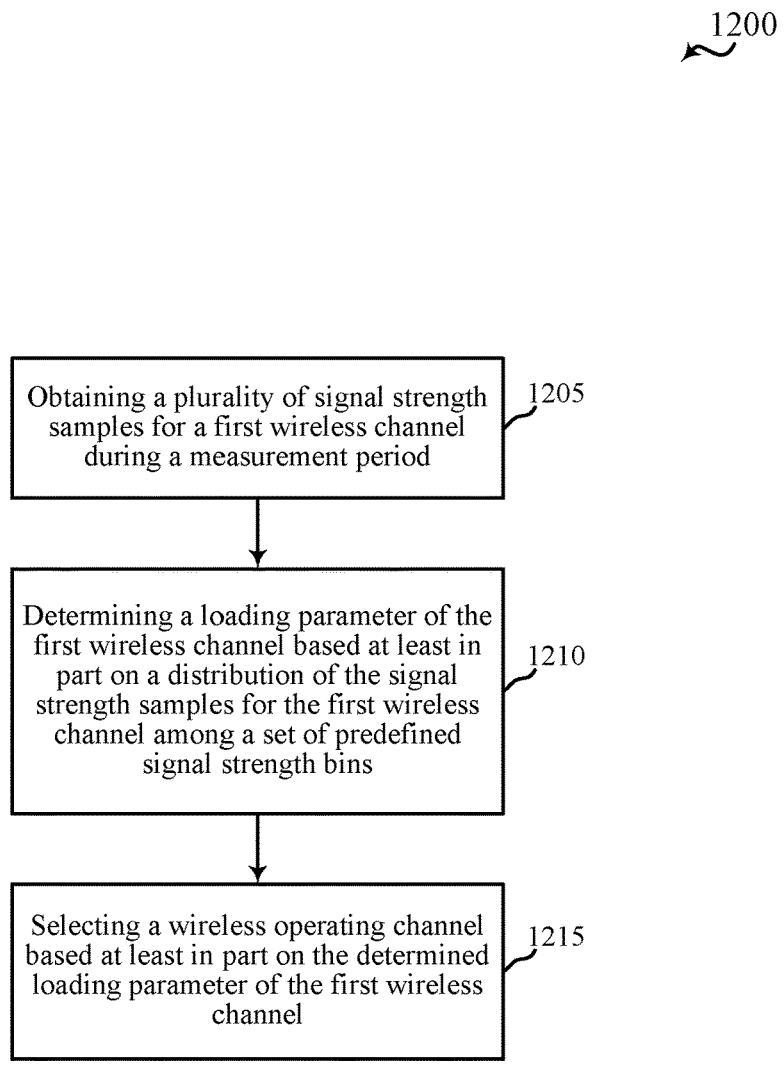
FIG. 12 is a flow chart illustrating an example of a method for wireless communication at a wireless communication device, in accordance with various aspects of the present disclosure.

FIG. 12 is a flow chart illustrating an example of a method 1200 for wireless communication at a wireless communication device, in accordance with various aspects of the present disclosure. For clarity, the method 1200 is described below with reference to a wireless communication device including aspects of one or more of the small cells 135, 235, 235-a, 335, 335-a, 335-b, or 1035 described with reference to FIG. 1, 2, 3, or 10, aspects of one or more of the base stations 105 described with reference to FIG. 1, aspects of one or more of the UEs 115, 215, 215-a, 215-b, or 1115 described with reference to FIG. 1, 2, or 11, or aspects of one or more of the apparatuses 735, 835, or 935 described with reference to FIG. 7, 8, or 9. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1205, the method 1200 may include obtaining a plurality of signal strength samples for a first wireless channel during a measurement period. In some examples, the first wireless channel may include a channel of an unlicensed spectrum, and the wireless communication device performing the method 1200 may be associated with a MNO using the unlicensed spectrum. In some examples, the method 1200 may include synchronizing the measurement period among multiple wireless communication devices associated with the MNO. The unlicensed spectrum may include a radio frequency spectrum available for Wi-Fi use, a radio frequency spectrum available for use by different radio access technologies, or a radio frequency spectrum available for use by multiple MNOs in an equally shared or prioritized manner. The operation(s) at block 1205 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, the signal strength identifier 740, 840, or 940 described with reference to FIG. 7, 8, or 9, or the measurement synchronizer 855 or 955 described with reference to FIG. 8 or 9.

At block 1210, the method 1200 may include determining a loading parameter of the first wireless channel based at least in part on a distribution of the signal strength samples for the first wireless channel among a set of predefined signal strength bins. The operation(s) at block 1210 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the loading parameter determiner 745, 845, or 945 described with reference to FIG. 7, 8, or 9.

At block 1215, the method 1200 may include selecting a wireless operating channel based at least in part on the determined loading parameter of the first wireless channel. The operation(s) at block 1215 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the wireless operating channel selector 750, 850, or 950 described with reference to FIG. 7, 8, or 9.

Thus, the method 1200 may provide for wireless communication. It should be noted that the method 1200 is just one implementation and that the operations of the method 1200 may be rearranged or otherwise modified such that other implementations are possible.

Figure 13:
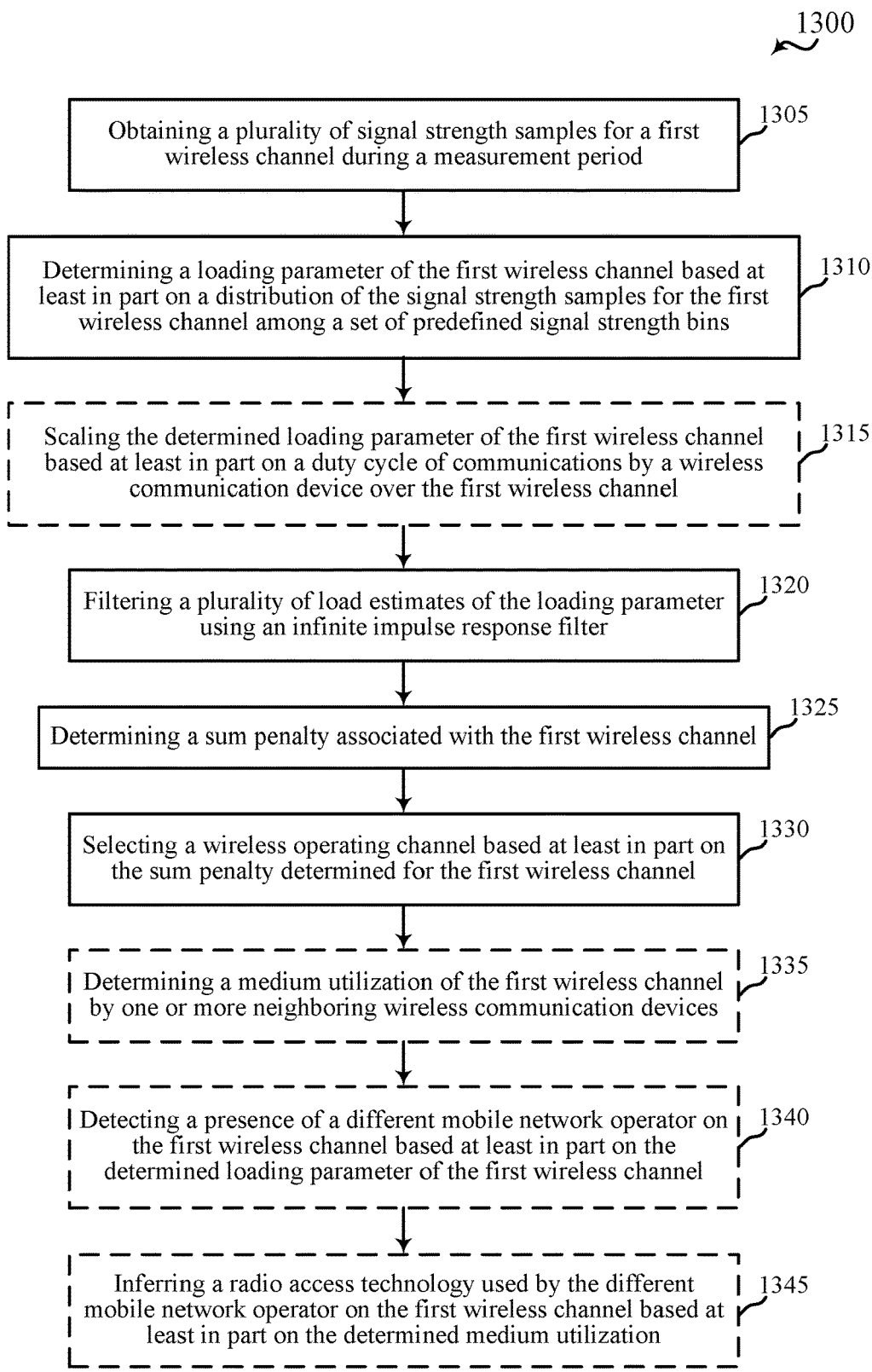
FIG. 13 is a flow chart illustrating an example of a method for wireless communication at a wireless communication device, in accordance with various aspects of the present disclosure.

FIG. 13 is a flow chart illustrating an example of a method 1300 for wireless communication at a wireless communication device, in accordance with various aspects of the present disclosure. For clarity, the method 1300 is described below with reference to a wireless communication device including aspects of one or more of the small cells 135, 235, 235-a, 335, 335-a, 335-b, or 1035 described with reference to FIG. 1, 2, 3, or 10, aspects of one or more of the base stations 105 described with reference to FIG. 1, aspects of one or more of the UEs 115, 215, 215-a, 215-b, or 1115 described with reference to FIG. 1, 2, or 11, or aspects of one or more of the apparatuses 735, 835, or 935 described with reference to FIG. 7, 8, or 9. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1305, the method 1300 may include obtaining a plurality of signal strength samples for a first wireless channel during a measurement period. In some examples, the first wireless channel may include a channel of an unlicensed spectrum, and the wireless communication device performing the method 1300 may be associated with a MNO using the unlicensed spectrum. In some examples, the method 1300 may include synchronizing the measurement period among multiple wireless communication devices associated with the MNO. The unlicensed spectrum may include a radio frequency spectrum available for Wi-Fi use, a radio frequency spectrum available for use by different radio access technologies, or a radio frequency spectrum available for use by multiple MNOs in an equally shared or prioritized manner. The operation(s) at block 1305 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, the signal strength identifier 740, 840, or 940 described with reference to FIG. 7, 8, or 9, or the measurement synchronizer 855 or 955 described with reference to FIG. 8 or 9.

At block 1310, the method 1300 may include determining a loading parameter of the first wireless channel based at least in part on a distribution of the signal strength samples for the first wireless channel among a set of predefined signal strength bins. The operation(s) at block 1310 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the loading parameter determiner 745, 845, or 945 described with reference to FIG. 7, 8, or 9.

At block 1315, the method 1300 may optionally include scaling the determined loading parameter of the first wireless channel based at least in part on a duty cycle of communications by the wireless communication device over the first wireless channel. In some examples, the loading parameter of the first wireless channel may be scaled when the first wireless channel is a current wireless operating channel of the wireless communication device performing the method 1300, but may not be scaled when the first wireless channel is not a current wireless operating channel of the wireless communication device performing the method 1300. The operation(s) at block 1315 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the loading parameter scaler 860 or 960 described with reference to FIG. 8 or 9.

At block 1320, the method 1300 may include filtering a plurality of load estimates of the loading parameter using an IIR filter. The operation(s) at block 1320 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the load estimate filterer 865 or 965 described with reference to FIG. 8 or 9.

At block 1325, the method 1300 may include determining a sum penalty associated with the first wireless channel. The sum penalty for the first wireless channel may be determined based at least in part on the loading parameter determined for the first wireless channel. In some examples, the sum penalty may also be determined based at least in part on one or more additional parameters from a group consisting of: a signal strength of one or more communications associated with a different radio access technology than a radio access technology used by the wireless communication device performing the method 1300 over the first wireless channel, a signal strength of one or more communications associated with a same radio access technology as the wireless communication device performing the method 1300 over the first wireless channel, a hidden node parameter, and a channel-specific bias parameter. The operation(s) at block 1325 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the sum penalty determiner 870 or 970 described with reference to FIG. 8 or 9.

At block 1330, the method 1300 may include selecting a wireless operating channel based at least in part on the sum penalty determined for the first wireless channel (which sum penalty is based at least in part on the loading parameter determined for the first wireless channel). The operation(s) at block 1330 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the wireless operating channel selector 750, 850, or 950 described with reference to FIG. 7, 8, or 9.

At block 1335, the method 1300 may optionally include determining a medium utilization of the first wireless channel by one or more neighboring wireless communication devices. The operation(s) at block 1335 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the medium utilization determiner 875 or 975 described with reference to FIG. 8 or 9.

At block 1340, the method 1300 may optionally include detecting a presence of a different MNO on the first wireless channel based at least in part on the determined loading parameter of the first wireless channel. The operation(s) at block 1340 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the MNO detector 880 described with reference to FIG. 8.

At block 1345, the method 1300 may optionally include inferring a radio access technology used by the different MNO on the first wireless channel based at least in part on the determined medium utilization. The operation(s) at block 1345 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the RAT detector 885 described with reference to FIG. 8.

Thus, the method 1300 may provide for wireless communication. It should be noted that the method 1300 is just one implementation and that the operations of the method 1300 may be rearranged or otherwise modified such that other implementations are possible.

Figure 14:
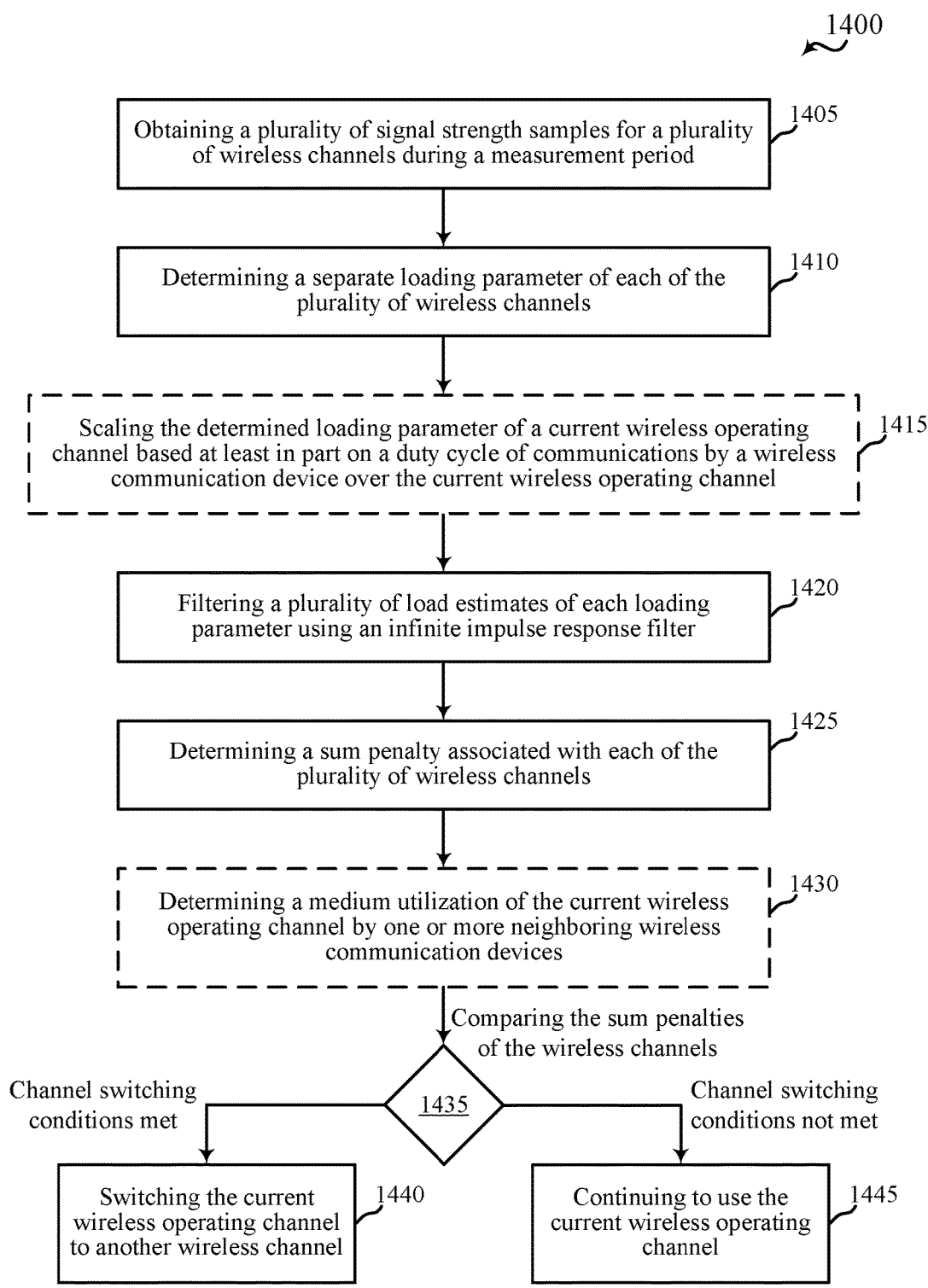
FIG. 14 is a flow chart illustrating an example of a method for wireless communication at a wireless communication device, in accordance with various aspects of the present disclosure.

FIG. 14 is a flow chart illustrating an example of a method 1400 for wireless communication at a wireless communication device, in accordance with various aspects of the present disclosure. For clarity, the method 1400 is described below with reference to a wireless communication device including aspects of one or more of the small cells 135, 235, 235-*a*, 335, 335-*a*, 335-*b*, or 1035 described with reference to FIG. 1, 2, 3, or 10, aspects of one or more of the base stations 105 described with reference to FIG. 1, aspects of one or more of the UEs 115, 215, 215-*a*, 215-*c*, or 1115 described with reference to FIG. 1, 2, or 11, or aspects of one or more of the apparatuses 735, 835, or 935 described with reference to FIG. 7, 8, or 9. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1405, the method 1400 may include obtaining a plurality of signal strength samples for a plurality of wireless channels during a measurement period. In some examples, the wireless channels may include channels of an unlicensed spectrum, and the wireless communication device performing the method 1400 may be associated with a MNO using the unlicensed spectrum. In some examples, the method 1400 may include synchronizing the measurement period among multiple wireless communication devices associated with the MNO. In some examples, signal strength samples for different wireless channels may be obtained at different times and/or different measurement periods may be provided for different wireless channels. The unlicensed spectrum may include a radio frequency spectrum available for Wi-Fi use, a radio frequency spectrum available for use by different radio access technologies, or a radio frequency spectrum available for use by multiple MNOs in an equally shared or prioritized manner. The operation(s) at block 1405 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, the signal strength identifier 740, 840, or 940 described with reference to FIG. 7, 8, or 9, or the measurement synchronizer 85*t* or 95*t* described with reference to FIG. 8 or 9.

At block 1410, the method 1400 may include determining a separate loading parameter of each of the plurality of wireless channels. Each loading parameter may be based at least in part on a distribution of the signal strength samples obtained for a wireless channel among a set of predefined signal strength bins. The operation(s) at block 1410 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the loading parameter determiner 745, 845, or 945 described with reference to FIG. 7, 8, or 9.

At block 1415, the method 1400 may include scaling the determined loading parameter of a current wireless operating channel of the wireless communication device performing the method 1400, based at least in part on a duty cycle of communications by the wireless communication device over the current wireless operating channel. In some examples, the determined loading parameter(s) of other wireless channels may not be scaled. The operation(s) at block 1415 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the loading parameter scaler 860 or 960 described with reference to FIG. 8 or 9.

At block 1420, the method 1400 may include filtering a plurality of load estimates of each loading parameter using an IIR filter. The operation(s) at block 1420 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the load estimate filterer 865 or 965 described with reference to FIG. 8 or 9.

At block 1425, the method 1400 may include determining a sum penalty associated with each of the plurality of wireless channels. The sum penalty for a wireless channel of interest may be determined based at least in part on a loading parameter determined for the wireless channel of interest. In some examples, the sum penalty for the wireless channel of interest may also be determined based at least in part on one or more additional parameters from a group consisting of: a signal strength of one or more communications associated with a different radio access technology than a radio access technology used by the wireless communication device performing the method 1400 over the wireless channel of interest, a signal strength of one or more communications associated with a same radio access technology as the wireless communication device performing the method 1400 over the wireless channel of interest, a hidden node parameter, and a channel-specific bias parameter. The operation(s) at block 1425 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the sum penalty determiner 870 or 970 described with reference to FIG. 8 or 9.

At block 1430, the method 1400 may optionally include determining a medium utilization of the current wireless operating channel (e.g., a first wireless channel used by the wireless communication device performing the method 1400) by one or more neighboring wireless communication devices. The operation(s) at block 1430 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, or the medium utilization determiner 875 or 975 described with reference to FIG. 8 or 9.

At block 1435, 1440, and/or 1445, the method 1400 may include selecting a wireless operating channel based at least in part on the sum penalties determined for the wireless channels (which sum penalties are based at least in part on the loading parameters determined for the wireless channels). At block 1435, the method 1400 may include comparing the sum penalties of the wireless channels. Upon determining that one or more conditions are met at block 1440, the method 1400 may continue at block 1440. At block 1440, the method 1400 may include switching the current wireless operating channel (e.g., the first wireless channel) to another wireless channel (e.g., a second wireless channel). Upon determining that one or more of the conditions are not met at block 1440, the method 1400 may include continuing to use the current wireless operating channel (e.g., to the first wireless channel) at block 1445. The operation(s) at block 1435, 1440, and/or 1445 may be performed using the wireless communication manager 720, 820, or 920 described with reference to FIG. 7, 8, or 9, the small cell wireless communication manager 1060 described with reference to FIG. 10, the UE wireless communication manager 1150 described with reference to FIG. 11, the wireless operating channel selector 750, 850, or 950 described with reference to FIG. 7, 8, or 9, or the sum penalty comparator 990 described with reference to FIG. 9.

In some examples of the method 1400, the one or more conditions evaluated at block 1440 may include a condition that a first sum penalty associated with the current wireless operating channel (e.g., the first wireless channel) is higher than a second sum penalty associated with the second wireless channel. In some examples, the one or more conditions may include a condition that the second wireless channel have the lowest sum penalty of the plurality of wireless channels and/or that the second sum penalty be lower than the first sum penalty for a minimum period of time (e.g., a hysteresis penalty). In some examples, the one or more conditions may also include a condition that the medium utilization of the current wireless operating channel (e.g., of the first wireless channel) by the one or more neighboring wireless communication devices satisfies a threshold. In these latter examples, the one or more conditions may also include a condition that the medium utilization of the current wireless operating channel be associated with signal strength samples satisfying an energy detection (ED) threshold and/or a condition that the second sum penalty be lower than the first sum penalty for a minimum period of time (e.g., a hysteresis penalty).

In some examples of the method 1400, a radio access technology-specific detection operation (e.g., a Wi-Fi detection operation) may be performed for one or more of the plurality of wireless channels, but may be disabled for at least a subset of the plurality of wireless channels.

Thus, the method 1400 may provide for wireless communication. It should be noted that the method 1400 is just one implementation and that the operations of the method 1400 may be rearranged or otherwise modified such that other implementations are possible.

In some examples, aspects of the methods 1200, 1300, or 1400 described with reference to FIG. 12, 13, or 14 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a wireless communication device, comprising:
   obtaining a plurality of signal strength samples for a first wireless channel during a measurement period;
   determining a loading parameter of the first wireless channel based at least in part on a distribution of the signal strength samples for the first wireless channel among a set of predefined signal strength bins, wherein each bin in the set of predefined signal strength bins is defined by a different signal strength threshold, and wherein each of the signal strength samples is assigned to one of the set of predefined signal strength bins based at least in part on a signal strength of the signal strength sample;
   selecting a wireless operating channel based at least in part on the determined loading parameter of the first wireless channel; and
   transmitting data over the wireless operating channel.

2. The method of claim 1, further comprising:
   scaling the determined loading parameter of the first wireless channel based at least in part on a duty cycle of communications by the wireless communication device over the first wireless channel.

3. The method of claim 1, further comprising:
   determining a separate loading parameter of each of a plurality of wireless channels, the plurality of wireless channels comprising the first wireless channel;
   wherein selecting the wireless operating channel comprises selecting the wireless operating channel from the plurality of wireless channels based at least in part on the determined separate loading parameters.

4. The method of claim 3, further comprising:
   determining a sum penalty associated with each of the plurality of wireless channels, wherein the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter.

5. The method of claim 4, wherein selecting the wireless operating channel comprises:
   determining that a first sum penalty associated with the first wireless channel is higher than a second sum penalty associated with a second wireless channel from the plurality of wireless channels; and
   switching a current wireless operating channel of the wireless communication device from the first wireless channel to the second wireless channel.

6. The method of claim 3, further comprising:
   disabling a radio access technology-specific detection operation for at least a subset of the plurality of wireless channels.

7. The method of claim 1, wherein the first wireless channel comprises a channel of an unlicensed spectrum, and the wireless communication device is associated with a mobile network operator using the unlicensed spectrum.

8. The method of claim 7, further comprising:
synchronizing the measurement period among multiple wireless communication devices associated with the mobile network operator.

9. The method of claim 7, further comprising:
detecting a presence of a different mobile network operator on the first wireless channel based at least in part on the determined loading parameter of the first wireless channel.

10. The method of claim 9, further comprising:
determining a medium utilization of the first wireless channel by one or more neighboring wireless communication devices; and
inferring a radio access technology used by the different mobile network operator on the first wireless channel based at least in part on the determined medium utilization.

11. The method of claim 1, further comprising:
filtering a plurality of load estimates of the loading parameter using an infinite impulse response filter; wherein the wireless operating channel is selected based at least in part on the filtered load estimates.

12. The method of claim 1, wherein each of the signal strength samples is assigned to one of the set of predefined signal strength bins irrespective of a frequency of the signal strength sample.

13. An apparatus for wireless communication at a wireless communication device, comprising:
means for obtaining a plurality of signal strength samples for a first wireless channel during a measurement period;
means for determining a loading parameter of the first wireless channel based at least in part on a distribution of the signal strength samples for the first wireless channel among a set of predefined signal strength bins, wherein each bin in the set of predefined signal strength bins is defined by a different signal strength threshold, and wherein each of the signal strength samples is assigned to one of the set of predefined signal strength bins based at least in part on a signal strength of the signal strength sample;
means for selecting a wireless operating channel based at least in part on the determined loading parameter of the first wireless channel; and
means for transmitting data over the wireless operating channel.

14. The apparatus of claim 13, further comprising:
means for scaling the determined loading parameter of the first wireless channel based at least in part on a duty cycle of communications by the wireless communication device over the first wireless channel.

15. The apparatus of claim 13, further comprising:
means for determining a separate loading parameter of each of a plurality of wireless channels, the plurality of wireless channels comprising the first wireless channel;
wherein the means for selecting the wireless operating channel comprises means for selecting the wireless operating channel from the plurality of wireless channels based at least in part on the determined separate loading parameters.

16. The apparatus of claim 15, further comprising:
means for determining a sum penalty associated with each of the plurality of wireless channels, wherein the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter.

17. The apparatus of claim 13, wherein the first wireless channel comprises a channel of an unlicensed spectrum, and the wireless communication device is associated with a mobile network operator using the unlicensed spectrum.

18. The apparatus of claim 17, further comprising:
means for detecting a presence of a different mobile network operator on the first wireless channel based at least in part on the determined loading parameter of the first wireless channel.

19. The apparatus of claim 18, further comprising:
means for determining a medium utilization of the first wireless channel by one or more neighboring wireless communication devices; and
means for inferring a radio access technology used by the different mobile network operator on the first wireless channel based at least in part on the determined medium utilization.

20. An apparatus for wireless communication at a wireless communication device, comprising:
a processor; and
memory coupled to the processor, wherein the processor is configured to:
obtain a plurality of signal strength samples for a first wireless channel during a measurement period;
determine a loading parameter of the first wireless channel based at least in part on a distribution of the signal strength samples for the first wireless channel among a set of predefined signal strength bins, wherein each bin in the set of predefined signal strength bins is defined by a different signal strength threshold, and wherein each of the signal strength samples is assigned to one of the set of predefined signal strength bins based at least in part on a signal strength of the signal strength sample;
select a wireless operating channel based at least in part on the determined loading parameter of the first wireless channel; and
transmit data over the wireless operating channel.

21. The apparatus of claim 20, wherein the processor is configured to:
scale the determined loading parameter of the first wireless channel based at least in part on a duty cycle of communications by the wireless communication device over the first wireless channel.

22. The apparatus of claim 20, wherein the processor is configured to:
determine a separate loading parameter of each of a plurality of wireless channels, the plurality of wireless channels comprising the first wireless channel;
wherein selecting the wireless operating channel comprises selecting the wireless operating channel from the plurality of wireless channels based at least in part on the determined separate loading parameters.

23. The apparatus of claim 22, wherein the processor is configured to:

determine a sum penalty associated with each of the plurality of wireless channels, wherein the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter.

24. The apparatus of claim 23, wherein selecting the wireless operating channel comprises:
determining that a first sum penalty associated with the first wireless channel is higher than a second sum penalty associated with a second wireless channel from the plurality of wireless channels; and
switching a current wireless operating channel of the wireless communication device from the first wireless channel to the second wireless channel.

25. The apparatus of claim 20, wherein the first wireless channel comprises a channel of an unlicensed spectrum, and the wireless communication device is associated with a mobile network operator using the unlicensed spectrum.

26. The apparatus of claim 25, wherein the processor is configured to:
synchronize the measurement period among multiple wireless communication devices associated with the mobile network operator.

27. The apparatus of claim 25, wherein the processor is configured to:
detect a presence of a different mobile network operator on the first wireless channel based at least in part on the determined loading parameter of the first wireless channel.

28. The apparatus of claim 27, wherein the processor is configured to:
determine a medium utilization of the first wireless channel by one or more neighboring wireless communication devices; and
infer a radio access technology used by the different mobile network operator on the first wireless channel based at least in part on the determined medium utilization.

29. A non-transitory computer-readable medium for storing instructions executable by a processor of a wireless communication device, the instructions comprising:
instructions to obtain a plurality of signal strength samples for a first wireless channel during a measurement period;
instructions to determine a loading parameter of the first wireless channel based at least in part on a distribution of the signal strength samples for the first wireless channel among a set of predefined signal strength bins, wherein each bin in the set of predefined signal strength bins is defined by a different signal strength threshold, and wherein each of the signal strength samples is assigned to one of the set of predefined signal strength bins based at least in part on a signal strength of the signal strength sample;
instructions to select a wireless operating channel based at least in part on the determined loading parameter of the first wireless channel; and
instructions to transmit data over the wireless operating channel.

30. The non-transitory computer-readable medium of claim 29, wherein the instructions further comprise:
instructions to determine a separate loading parameter of each of a plurality of wireless channels, the plurality of wireless channels comprising the first wireless channel;
wherein selecting the wireless operating channel comprises selecting the wireless operating channel from the plurality of wireless channels based at least in part on the determined separate loading parameters.

31. The non-transitory computer-readable medium of claim 30, wherein the instructions further comprise:
instructions to determine a sum penalty associated with each of the plurality of wireless channels, wherein the sum penalty for a wireless channel of interest is determined based at least in part on a loading parameter determined for the wireless channel of interest and at least one or more additional parameters from a group consisting of: a signal strength of one or more communications associated with a different radio access technology than a radio access technology used by the wireless communication device over the wireless channel of interest, a signal strength of one or more communications associated with a same radio access technology as the wireless communication device over the wireless channel of interest, a hidden node parameter, and a channel-specific bias parameter.

* * * * *